(12) United States Patent
Hayakawa

(10) Patent No.: US 7,683,598 B2
(45) Date of Patent: Mar. 23, 2010

(54) POWER SUPPLY CIRCUIT, POWER SUPPLY CONTROL CIRCUIT, AND POWER SUPPLY CONTROL METHOD

(75) Inventor: Toshiyuki Hayakawa, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 320 days.

(21) Appl. No.: 11/976,507

(22) Filed: Oct. 25, 2007

(65) Prior Publication Data

US 2008/0100274 A1 May 1, 2008

(30) Foreign Application Priority Data

Oct. 30, 2006 (JP) ............... 2006-294392

(51) Int. Cl.
*G05F 1/40* (2006.01)

(52) U.S. Cl. ............... 323/288; 363/16; 307/100

(58) Field of Classification Search ........... 323/205, 323/207, 225, 232, 235, 247, 282–288; 363/16–17, 363/20, 34, 39, 95, 97, 131, 141; 307/64, 307/66, 100, 82; 331/57
See application file for complete search history.

(56) References Cited

U.S. PATENT DOCUMENTS

| | | | | |
|---|---|---|---|---|
| 5,479,090 | A  * | 12/1995 | Schultz ..................... | 323/284 |
| 6,462,962 | B1 * | 10/2002 | Cuk ........................... | 363/16 |
| 6,791,848 | B2 * | 9/2004 | Porter et al. ............. | 363/21.01 |
| 6,879,502 | B2 * | 4/2005 | Yoshida et al. ............ | 363/60 |
| 7,274,116 | B2 * | 9/2007 | Inoue et al. ................ | 307/100 |
| 7,279,995 | B2 * | 10/2007 | Kernahan et al. .......... | 331/57 |
| 7,595,624 | B2 * | 9/2009 | Tateishi et al. ............ | 323/288 |

FOREIGN PATENT DOCUMENTS

| | | |
|---|---|---|
| JP | 07-021791 | 1/1995 |
| JP | 09-154275 | 6/1997 |
| JP | 09-294368 | 11/1997 |

\* cited by examiner

*Primary Examiner*—Rajnikant B Patel
(74) *Attorney, Agent, or Firm*—Arent Fox LLP

(57) ABSTRACT

A DC-DC converter and first and second bypass switch circuits are provided in parallel between an input pin and first and second output pins and operate in accordance with a combination of the voltage value of the input pin and the voltage value required for the first output pin. A start control circuit causes the DC-DC converter to operate unconditionally in a step-down mode during the period from when the DC-DC converter is started until the output voltage of the DC-DC converter becomes equal to the voltage of the input pin. An output slope control circuit synchronizes rising slopes of the output voltages of the first and second bypass switch circuits with a rising slope of the output voltage of the DC-DC converter.

11 Claims, 16 Drawing Sheets

| JDG (Vi) | MEM (Vo1) | SWD1 | SWD2 | D1 | D2 | D3 | D4 | D5 | D6 | D7 |
|---|---|---|---|---|---|---|---|---|---|---|
| H (3.3V) | H (3.3V) | L | L | Q1 | /Q1 | Q2 | L | /Q2 | H | H |
| H (3.3V) | L (1.8V) | H | L | Q1 | /Q1 | Q2 | /Q2 | /Q2 | L | H |
| L (1.8V) | H (3.3V) | H | H | Q1 | /Q1 | Q2 | /Q2 | L | L | L |
| L (1.8V) | L (1.8V) | H | L | Q1 | /Q1 | Q2 | /Q2 | /Q2 | L | H |

Fig. 3

POWER SUPPLY CIRCUIT, POWER SUPPLY CONTROL CIRCUIT, AND POWER SUPPLY CONTROL METHOD

CROSS REFERENCE TO RELATED APPLICATION

This application is based upon and claims the benefit of priority from Japanese Patent Application No. 2006-294392, filed on Oct. 30, 2006, the entire contents of which are incorporated herein by reference.

BACKGROUND

1. Field

The embodiment relates to a power supply circuit, a power supply control circuit, and a power supply control method.

2. Description of the Related Art

Recently, a memory card has become wide-spread as a data recording medium of portable electronic equipment (digital camera, mobile phone, etc.). The operation voltage of a memory card is determined in accordance with the operation voltage of a non-volatile memory (flash memory etc.) mounted on the memory card. For example, there exist a non-volatile memory with the operation voltage of 3.3 V and one with that of 1.8 V. Consequently, there also exist a memory card with the operation voltage of 3.3 V and one with that of 1.8 V.

In order to make the operation voltage of a memory card independent from that of an internal non-volatile memory, it is required to mount a DC-DC converter on the memory card. It is necessary for the memory card to mount, in addition to a non-volatile memory, a logic circuit for controlling the non-volatile memory. However, it is inefficient to mount two kinds of logic circuits (a logic circuit for 3.3 V and that for 1.8 V) on a memory card in accordance with the operation voltage of the non-volatile memory and when the fact that the voltage of a semiconductor device constituting a logic circuit is fixed accompanying the reduction in size thereof is considered, it is desirable to mount only the logic circuit for 1.8 V on the memory card. However, it is required to mount both the DC-DC converter for the logic circuit and that for the non-volatile memory on the memory card. By the way, techniques relating to a DC-DC converter are disclosed in Japanese Unexamined Patent Application Publication No. Hei 7-21791, Japanese Unexamined Patent Application Publication No. Hei 9-154275, Japanese Unexamined Patent Application Publication No. Hei 9-294368, etc.

It is possible to realize the independence of the operation voltage of the memory card from that of the internal non-volatile memory by mounting a DC-DC converter on the memory, however, it is very inefficient only to mount simply two or more DC-DC converters on the memory card. In addition, since the memory card is inserted/removed into/from electronic equipment in an activated state, when a voltage required inside the memory card is generated by a boost DC-DC converter, there arises a problem that the input voltage flows through to the output side when the memory card is inserted into the electronic equipment, causing an inrush current. Further, if the rising timing of the power supply voltage of the non-volatile memory and the power supply voltage of the logic circuit is not considered, there is the possibility of the risk of burn-out caused by latch-up of the semiconductor device constituting the non-volatile memory or the logic circuit.

SUMMARY

The embodiment provides that a power supply circuit including an input pin receiving a voltage of either a first predetermined value or a second predetermined value smaller than the first predetermined value, a first output pin for which an output of a voltage of either the first or second predetermined value is required, a second output pin for which an output of a voltage of the second predetermined value is required, a DC-DC converter generating an output voltage from the voltage of the input pin in either a step-down mode or a boost mode and outputting the output voltage to at least one of the first and second output pins in accordance with a combination of the voltage value of the input pin and the voltage value required for the first output pin, a first bypass switch circuit turning on to output the voltage of the input pin to the first output pin when the voltage is not output to the first output pin from the DC-DC converter, a second bypass switch circuit turning on to output the voltage of the input pin to the second output pin when the voltage is not output to the second output pin from the DC-DC converter, a start control circuit causing the DC-DC converter to operate in the step-down mode irrespective of the combination of the voltage value of the input pin and the voltage value required for the first output pin during the period from when the DC-DC converter is started until the output voltage of the DC-DC converter becomes equal to the voltage of the input pin, and an output slope control circuit synchronizing a rising slope of the output voltage of the first bypass switch circuit with a rising slope of the output voltage of the DC-DC converter when the first bypass switch circuit turns on and synchronizes a rising slope of the output voltage of the second bypass switch circuit with a rising slope of the output voltage of the DC-DC converter when the second bypass switch circuit turns on.

BRIEF DESCRIPTION OF THE DRAWINGS

The nature, principle, and utility of the embodiment will become more apparent from the following detailed description when read in conjunction with the accompanying drawings in which like parts are designated by identical reference numbers, in which:

FIG. 3 is an explanatory diagram showing an operation of a decoder;

DESCRIPTION OF THE PREFERRED EMBODIMENT

Figure 1:
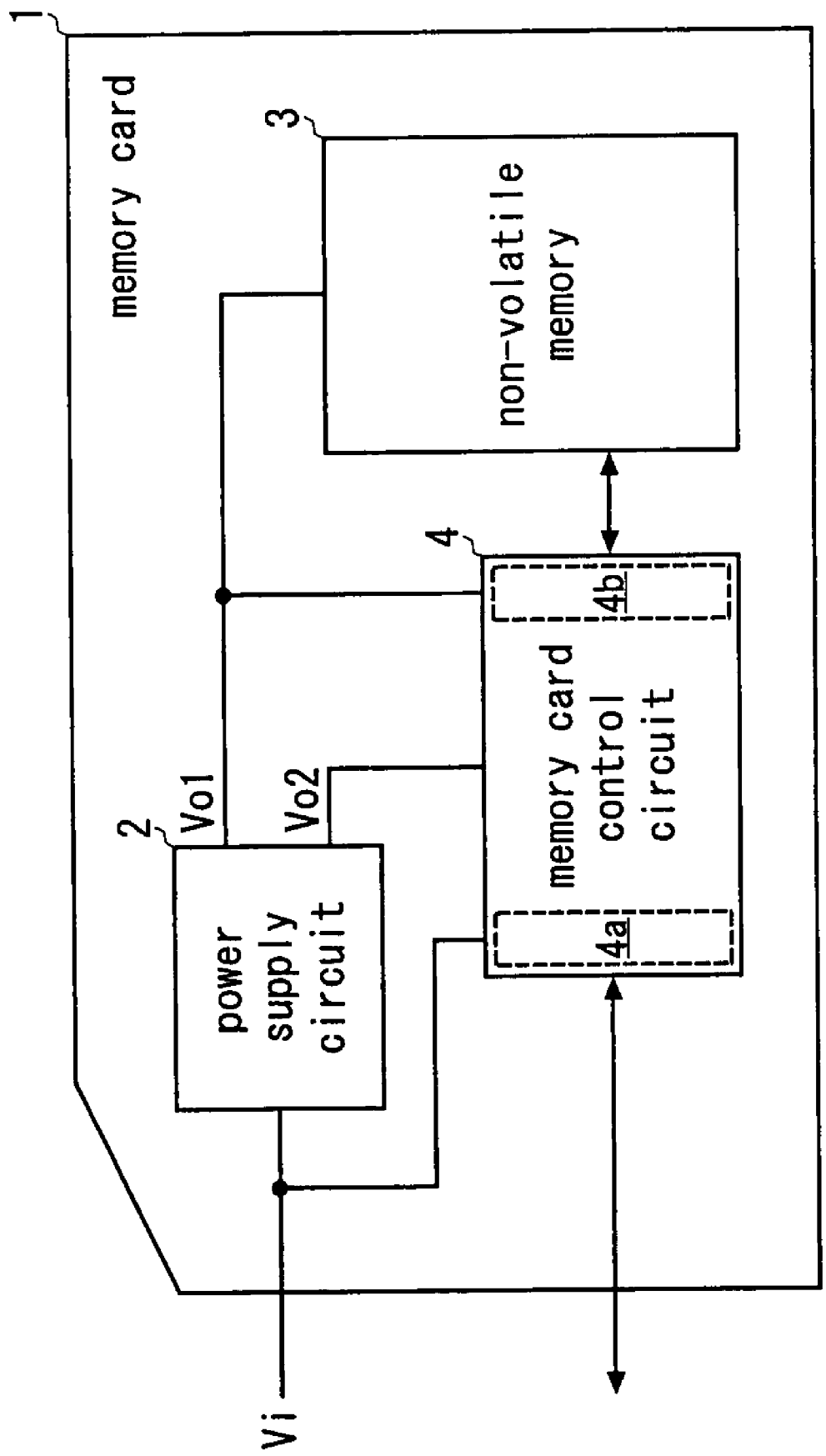
FIG. 1 is an explanatory diagram showing an embodiment.

An embodiment will be described below with reference to drawings. FIG. 1 shows an embodiment. A memory card 1 to which the embodiment has been applied is configured so as to include a power supply circuit 2, a non-volatile memory 3, and a memory card control circuit 4. For example, the power supply circuit 2, the non-volatile memory 3, and the memory card control circuit 4 are configured by separate semiconductor devices and are coupled to one another on a printed-circuit board. The power supply circuit 2 generates a first output voltage Vo1 (3.3 V or 1.8 V) and a second output voltage Vo2 (1.8 V) from an input voltage Vi (3.3 V or 1.8 V). The non-volatile memory 3 uses the first output voltage Vo1 of the power supply circuit 2 as a power supply voltage. The memory card control circuit 4 uses the second output voltage Vo2 of the power supply circuit 2 as a power supply voltage. However, in the memory card control circuit 4, an external interface circuit 4a (a circuit that transmits and receives an address signal and a data signal to and from the outside) uses the input voltage Vi as a power supply voltage and a memory interface circuit 4b (a circuit that transmits and receives an address signal and a data signal to and from the non-volatile memory 3) uses the first output voltage Vo1 of the power supply circuit 2 as a power supply voltage.

Figure 2:
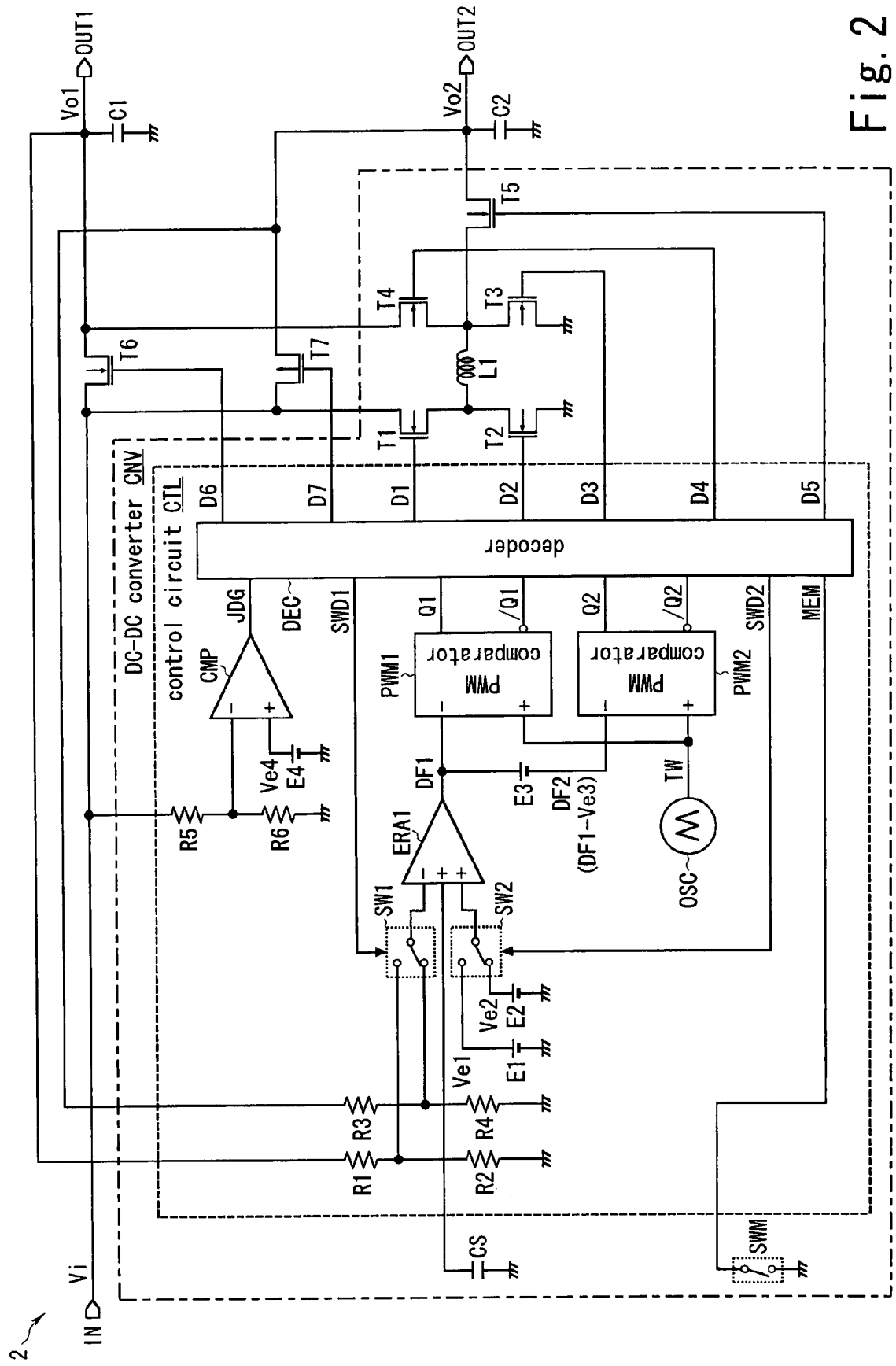
FIG. 2 is an explanatory diagram showing a configuration of a power supply circuit.

FIG. 2 shows the configuration of the power supply circuit 2. The power supply circuit 2 is configured so as to include a first bypass switch circuit T6, a second bypass switch circuit T7, a first smoothing capacitor C1, a second smoothing capacitor C2, and a DC-DC converter CNV. The first bypass switch circuit T6 is provided in order to output the input voltage Vi (the voltage of an input pin IN of the power supply circuit 2) as the first output voltage Vo1 (the voltage of a first output pin OUT1 of the power supply circuit 2) and configured by an n-type transistor. The input pin of the first bypass switch circuit T6 is coupled to the input pin IN of the power supply circuit 2. The output pin of the first bypass switch circuit T6 is coupled to the first output pin OUT1 of the power supply circuit 2. A control pin of the first bypass switch circuit T6 receives a control signal D6 supplied from a decoder DEC of a control circuit CTL in the DC-DC converter CNV.

The second bypass switch circuit T7 is provided in order to output the input voltage Vi as the second output voltage Vo2 (the voltage of a second output pin OUT2 of the power supply circuit 2) and is configured by a p-type transistor. The input pin of the second bypass switch circuit T7 is coupled to the input pin IN of the power supply circuit 2. The output pin of the second bypass switch circuit T7 is coupled to the second output pin OUT2 of the power supply circuit 2. The control pin of the second bypass switch circuit T7 receives a control signal D7 supplied from the decoder DEC of the control circuit CTL in the DC-DC converter CNV. The first smoothing capacitor C1 is provided in order to smooth the first output voltage Vo1 and is coupled between the first output pin OUT1 of the power supply circuit 2 and a ground line. The second smoothing capacitor C2 is provided in order to smooth the second output voltage Vo2 and is coupled between the second output pin OUT2 of the power supply circuit 2 and a ground line.

The DC-DC converter CNV operates as either a step-down type DC-DC converter or a boost type DC-DC converter in accordance with a combination of the voltage value of the input voltage Vi and the voltage value (the voltage value of the first output voltage Vo1) of the operation voltage of the non-volatile memory 3. The DC-DC converter CNV is configured so as to include a step-down main switching transistor T1, a step-down synchronous commutator circuit T2, a choke coil L1, a boost main switching transistor T3, a boost synchronous commutator circuits T4 and T5, a soft-start capacitor CS, a switch circuit SWM, and the control circuit CTL.

The step-down main switching transistor T1 is configured by an n-type transistor. The input pin of the step-down main switching transistor T1 is coupled to the input pin IN of the power supply circuit 2. The output pin of the step-down main switching transistor T1 is coupled to one pin of the choke coil L1. The control pin of the step-down main switching transistor T1 receives a control signal D1 supplied from the decoder DEC of the control circuit CTL. The step-down synchronous commutator circuit T2 is configured by an n-type transistor. The input pin of the step-down synchronous commutator circuit T2 is coupled to a ground line. The output pin of the step-down synchronous commutator circuit T2 is coupled to one pin of the choke coil L1. The control pin of the step-down synchronous commutator circuit T2 receives a control signal D2 supplied from the decoder DEC of the control circuit CTL.

The boost main switching transistor T3 is configured by an n-type transistor. The input pin of the boost main switching transistor T3 is coupled to the other pin of the choke coil L1. The output pin of the boost main switching transistor T3 is coupled to a ground line. The control pin of the boost main switching transistor T3 receives a control signal D3 supplied from the decoder DEC of the control circuit CTL. The boost synchronous commutator circuit T4 is configured by an n-type transistor. The input pin of the boost synchronous commutator circuit T4 is coupled to the other pin of the choke coil L1. The output pin of the boost synchronous commutator circuit T4 is coupled to the first output pin OUT1 of the power supply circuit 2. The control pin of the boost synchronous commutator circuit T4 receives a control signal D4 supplied from the decoder DEC of the control circuit CTL. The boost synchronous commutator circuit T5 is configured by an n-type transistor. The input pin of the boost synchronous commutator circuit T5 is coupled to the other pin of the choke coil L1. The output pin of the boost synchronous commutator circuit T5 is coupled to the second output pin OUT2 of the power supply circuit 2. The control pin of the boost synchronous commutator circuit T5 receives a control signal D5 supplied from the decoder DEC of the control circuit CTL.

One pin of the soft-start capacitor CS is coupled to, out of first and second non-inverting input pins of an error amplifier ERA1 in the control circuit CTL, the second non-inverting input pin. The other pin of the soft-start capacitor CS is coupled to a ground line. The soft-start capacitor CS is charged gradually via a constant-current circuit (not shown) accompanying the start of the DC-DC converter CNV and is discharged gradually via a discharging resistor (not shown) accompanying the termination of the DC-DC converter CNV.

The switch circuit SWM is provided in order to generate a memory voltage request signal MEM indicative of which one is requested, 3.3 V or 1.8 V, as the operation voltage of the non-volatile memory 3. The switch circuit SWM enters the off-state in order to set the memory voltage request signal MEM to a high level when 3.3 V is requested as the operation voltage of the non-volatile memory 3. The switch circuit SWM enters the on-state in order to set the memory voltage request signal MEM to a low level when 1.8 V is requested as the operation voltage of the non-volatile memory 3.

The control circuit CTL is configured so as to include resistors R1 to R6, switch circuits SW1 and SW2, voltage generators E1 to E4, the error amplifier ERA1, a triangular wave oscillator OSC, a step-down PWM comparator PWM1, a boost PWM comparator PWM2, and the decoder DEC. One pin of the resistor R1 is coupled to the first output pin OUT1 of the power supply circuit 2. The other pin of the resistor R1 is coupled to one pin of the resistor R2. The other pin of the resistor R2 is coupled to a ground line. One pin of the resistor R3 is coupled to the second output pin OUT2 of the power supply circuit 2. The other pin of the resistor R3 is coupled to one pin of the resistor R4. The other pin of the resistor R4 is coupled to a ground line. The voltage generator E1 generates a reference voltage Ve1. The voltage generator E2 generates a reference voltage Ve2.

The switch circuit SW1 couples the coupling node of the resistors R1 and R2 to the inverting input pin of the error amplifier ERA1 when a control signal SWD1 supplied from the decoder DEC indicates a high level, and couples the coupling node of the resistors R3 and R4 to the inverting input pin of the error amplifier ERA1 when the control signal SWD1 indicates a low level. The switch circuit SW2 couples the output pin of the voltage generator E1 to a first non-inverting input pin of the error amplifier ERA1 when a control signal SWD2 supplied from the decoder DEC indicates a high level, and couples the output pin of the voltage generator E2 to the first non-inverting input pin of the error amplifier ERA1 when the control signal SWD2 indicates a low level.

The error amplifier ERA1 receives a voltage supplied via the switch circuit SW1 at the inverting input pin, receives a voltage supplied via the switch circuit SW2 at the first non-inverting input pin, and receives a voltage generated by the soft-start capacitor CS at the second non-inverting input pin. The error amplifier ERA1 generates an output signal DF1 by amplifying the voltage difference between the voltage of the inverting input pin and the lower one of the voltage of the first non-inverting input pin and the voltage of the second non-inverting input pin. The triangular wave oscillator OSC generates a triangular wave signal TW having a predetermined period. The voltage generator E3 generates an output signal DF2 by subtracting an offset voltage Ve3 from the voltage of the output signal DF1 of the error amplifier ERA1. By the way, the offset voltage Ve3 is set to the same voltage value as the wave-height value of the triangular wave signal TW supplied from the triangular wave oscillator OSC.

The step-down PWM comparator PWM1 receives the output signal DF1 of the error amplifier ERA1 at the inverting input pin and receives the triangular wave signal TW supplied from the triangular wave oscillator OSC at the non-inverting input pin. The step-down PWM comparator PWM1 sets an output signal Q1 to a high level when the voltage of the output signal DF1 of the error amplifier ERA1 is higher than that of the triangular wave signal TW and sets an output signal /Q1 to a low level. The step-down PWM comparator PWM1 sets the output signal Q1 to a low level when the voltage of the output signal DF1 of the error amplifier ERA1 is lower than that of the triangular wave signal TW and sets the output signal /Q1 to a high level.

The boost PWM comparator PWM2 receives the output signal DF2 of the voltage generator E3 at the inverting input pin and receives the triangular wave signal TW supplied from the triangular wave oscillator OSC at the non-inverting input pin. The boost PWM comparator PWM2 sets an output signal Q2 to a high level when the voltage of the output signal DF2 of the voltage generator E3 is higher than that of the triangular wave signal TW and sets an output signal /Q2 to a low level. The boost PWM comparator PWM2 sets the output signal Q2 to a low level when the voltage of the output signal DF2 of the voltage generator E3 is lower than that of the triangular wave signal TW and sets the output signal /Q2 to a high level.

One pin of the resistor R5 is coupled to the input pin IN of the power supply circuit 2. The other pin of the resistor R5 is coupled to one pin of the resistor R6. The other pin of the resistor R6 is coupled to a ground line. The voltage generator E4 generates a reference voltage Ve4. A voltage comparator CMP is provided in order to determine whether the input voltage Vi is 3.3 V or 1.8 V. The voltage comparator CMP receives the voltage (the voltage of the input voltage Vi divided by the resistors R5 and R6) of the coupling node of the resistors R5 and R6 at the inverting input pin and receives the reference voltage Ve4 supplied from the voltage generator E4 at the non-inverting input pin. The voltage comparator CMP sets an output signal JDG to a high level when the voltage of the coupling node of the resistors R5 and R6 is higher than the reference voltage Ve4 and sets the output signal JDG to a low level when the voltage of the coupling node of the resistors R5 and R6 is lower than the reference voltage Ve4. The decoder DEC generates the control signals SWD1, SWD2, and D1 to D7 based on the output signal JDG of the voltage comparator CMP, the memory voltage request signal MEM, the output signals Q1 and /Q1 of the step-down PWM comparator PWM1, and the output signals Q2 and /Q2 of the boost PWM comparator PWM2.

FIG. 3 shows the operation of the decoder DEC. When the output signal JDG of the voltage comparator CMP is set to a high level and the memory voltage request signal MEM generated by the switch circuit SWM is set to a high level (when 3.3 V is supplied as the input voltage Vi and 3.3 V is requested as the operation voltage of the non-volatile memory 3), the decoder DEC sets the control signals D6 and D7 to a high level as well as setting the control signals SWD1, SWD2, and D4 to a low level. In addition, the decoder DEC outputs the output signals Q2 and /Q2 of the boost PWM comparator PWM2 as the control signals D3 and D5 as well as outputting the output signals Q1 and /Q1 of the step-down PWM comparator PWM1 as the control signals D1 and D2.

When the output signal JDG of the voltage comparator CMP is set to a high level and the memory voltage request signal MEM generated by the switch circuit SWM is set to a low level (when 3.3 V is supplied as the input voltage Vi and 1.8 V is requested as the operation voltage of the non-volatile memory 3), the decoder DEC sets the control signals SWD2 and D6 to a low level as well as setting the control signals SWD1 and D7 to a high level. In addition, the decoder DEC outputs the output signal Q2 of the boost PWM comparator PWM2 as the control signals D3 and outputs the output signal /Q2 of the boost PWM comparator PWM2 as the control signals D4 and D5 as well as outputting the output signals Q1 and /Q1 of the step-down PWM comparator PWM1 as the control signals D1 and D2.

When the output signal JDG of the voltage comparator CMP is set to a low level and the memory voltage request signal MEM generated by the switch circuit SWM is set to a high level (when 1.8 V is supplied as the input voltage Vi and 3.3 V is requested as the operation voltage of the non-volatile memory 3), the decoder DEC sets the control signals D5, D6, and D7 to a low level as well as setting the control signals SWD1 and SWD2 to a high level. In addition, the decoder DEC outputs the output signals Q2 and /Q2 of the boost PWM comparator PWM2 as the control signals D3 and D4 as well as outputting the output signals Q1 and /Q1 of the step-down PWM comparator PWM1 as the control signals D1 and D2.

When the output signal JDG of the voltage comparator CMP is set to a low level and the memory voltage request signal MEM generated by the switch circuit SWM is set to a low level (when 1.8 V is supplied as the input voltage Vi and 1.8 V is requested as the operation voltage of the non-volatile memory 3), the decoder DEC sets the control signals SWD2 and D6 to a low level as well as setting the control signals SWD1 and D7 to a high level. In addition, the decoder DEC outputs the output signal Q2 of the boost PWM comparator PWM2 as the control signal D3 and outputs the output signal /Q2 of the boost PWM comparator PWM2 as the control signals D4 and D5 as well as outputting the output signals Q1 and /Q1 of the step-down PWM comparator PWM1 as the control signals D1 and D2.

Here, the operation of the power supply circuit 2 will be described separately by four cases: (first mode), 3.3 V is supplied as the input voltage Vi and 3.3 V is requested as the operation voltage of the non-volatile memory 3; (second mode), 3.3 V is supplied as the input voltage Vi and 1.8 V is requested as the operation voltage of the non-volatile memory 3; (third mode), 1.8 V is supplied as the input voltage Vi and 3.3 V is requested as the operation voltage of the non-volatile memory 3; and (fourth mode), 1.8 V is supplied as the input voltage Vi and 1.8 V is requested as the operation voltage of the non-volatile memory 3.

Figure 4:
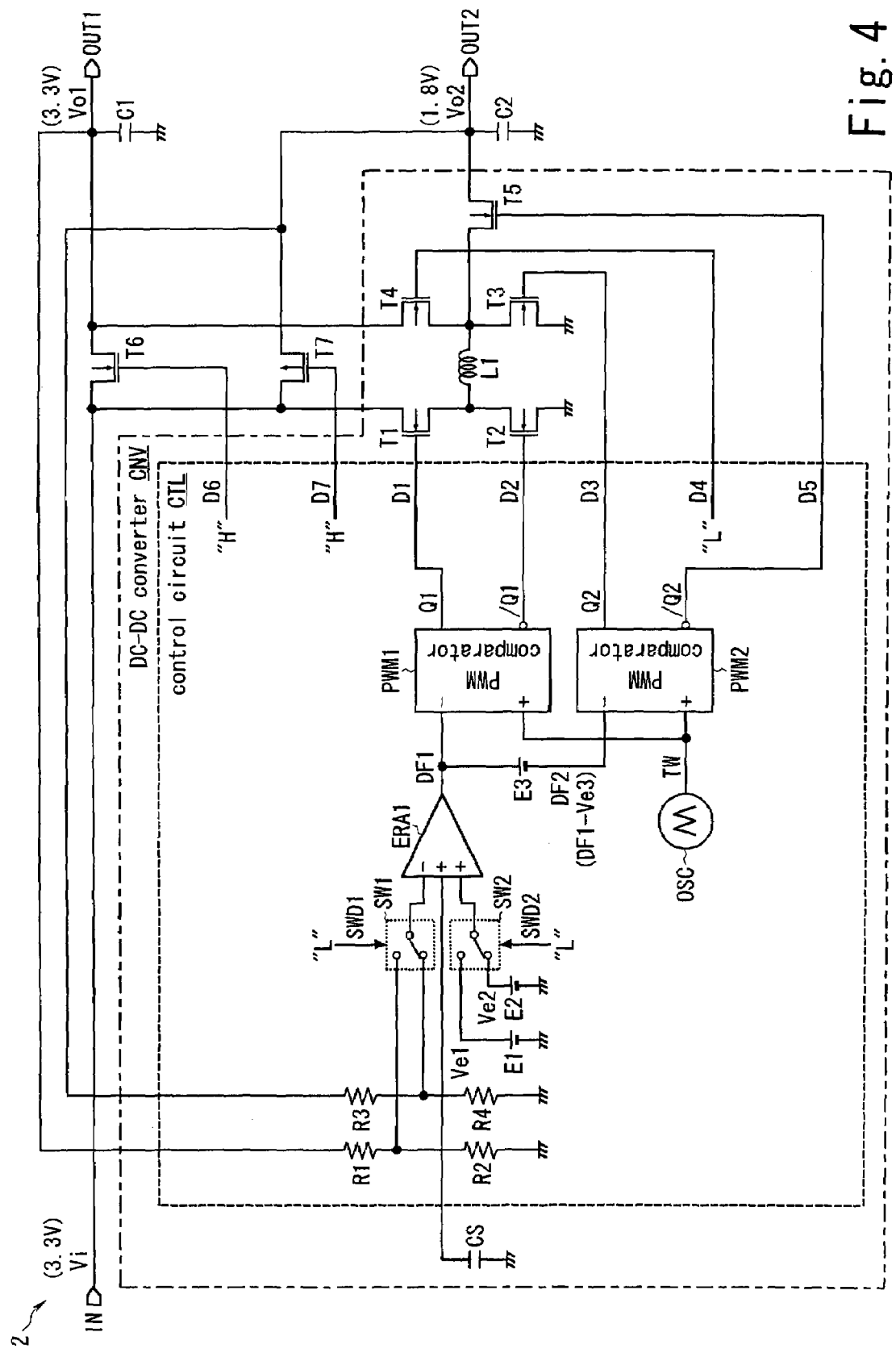
FIG. 4 is an explanatory diagram showing an operation (first mode) of the power supply circuit.

FIG. 4 shows the operation (first mode) of the power supply circuit 2. When 3.3 V is supplied as the input voltage Vi and 3.3 V is requested as the operation voltage of the non-volatile memory 3, the control signal D4 is set to a low level and the control signal D6 is set to a high level. Due to this, the boost synchronous commutator circuit T4 is always in the off-state and the first bypass switch circuit T6 is always in the on-state. Consequently, the input voltage Vi is output as the first output voltage Vo1. In addition, the control signal D7 is fixed to a high level. Due to this, the second bypass switch circuit T7 is always in the off-state.

The control signals SWD1 and SWD2 are set to a low level. Consequently, the switch circuit SW1 couples the coupling node of the resistors R3 and R4 to the inverting input pin of the error amplifier ERA1 and the switch circuit SW2 couples the output pin of the voltage generator E2 to the first non-inverting input pin of the error amplifier ERA1. Since the soft-start capacitor CS is charged by a constant-current circuit during the operation of the DC-DC converter CNV, the voltage of the second non-inverting input pin is higher than the voltage of the first non-inverting input pin at the error amplifier ERA1. Consequently, during the operation of the DC-DC converter CNV, the error amplifier ERA1 generates the output signal DF1 by amplifying the voltage difference between the voltage of the second output voltage Vo2 divided by the resistors R3 and R4 and, the reference voltage Ve2.

The step-down PWM comparator PWM1 sets the output signal /Q1 to a low level as well as setting the output signal Q1 to a high level when the voltage of the output signal DF1 of the error amplifier ERA1 is higher than the triangular wave signal TW supplied from the triangular wave oscillator OSC, and sets the output signal /Q1 to a high level as well as setting the output signal Q1 to a low level when the voltage of the output signal DF1 of the error amplifier ERA1 is lower than the triangular wave signal TW. The output signals Q1 and /Q1 of the step-down PWM comparator PWM1 are output as the control signals D1 and D2.

The boost PWM comparator PWM2 sets the output signal /Q2 to a low level as well as setting the output signal Q2 to a high level when the voltage (the voltage obtained by subtracting the offset voltage Ve3 from the output voltage DF1 of the error amplifier ERA1) of the output signal DF2 of the voltage generator E3 is higher than the voltage of the triangular wave signal TW supplied from the triangular wave oscillator OSC, and sets the output signal /Q2 to a high level as well as setting the output signal Q2 to a low level when the voltage of the output signal DF2 of the voltage generator E3 is lower than the voltage of the triangular wave signal TW. The output signals Q2 and /Q2 of the boost PWM comparator PWM2 are output as the control signals D3 and D5.

Figure 5:
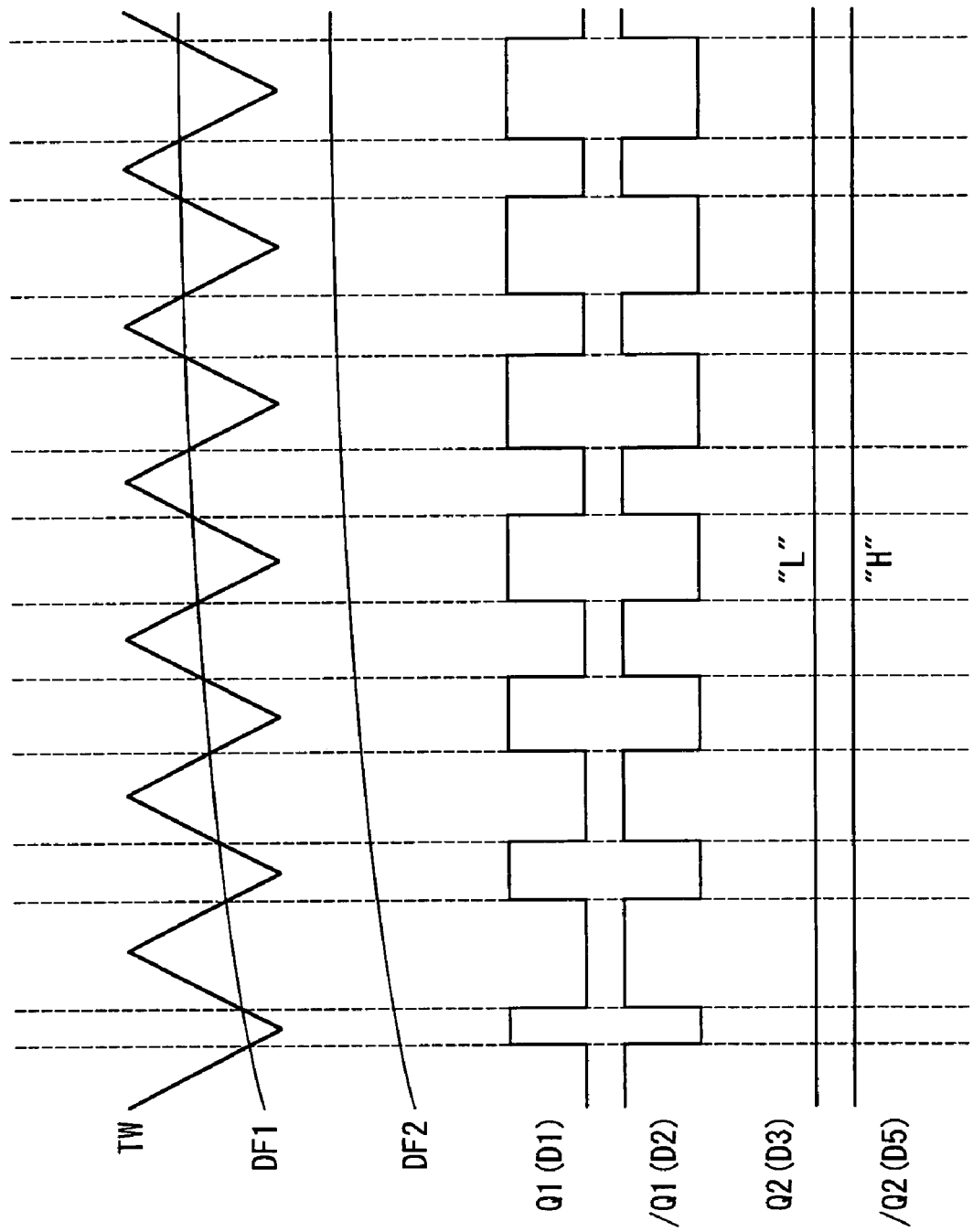
FIG. 5 is an explanatory diagram showing an operation (first mode) of a step-down PWM comparator and a boost PWM comparator.

FIG. 5 shows the operation (first mode) of the step-down PWM comparator PWM 1 and the boost PWM comparator PWM2. When 3.3 V is supplied as the input voltage Vi and 3.3 V is requested as the operation voltage of the non-volatile memory 3, since the voltage (the voltage of the output signal DF2 of the voltage generator E3) of the inverting input pin is always lower than the voltage (the voltage of the triangular wave signal TW supplied from the triangular wave oscillator OSC) of the non-inverting input pin at the boost PWM comparator PWM2, the output signal Q2 is always set to a low level and the output signal /Q2 is always set to a high level (a state of 0% duty). Since the output signal Q2 of the boost PWM comparator PWM2 is output as the control signal D3, the boost main switching transistor T3 is always in the off-state. In addition, since the output signal /Q2 of the boost PWM comparator PWM2 is output as the control signal D5, the boost synchronous commutator circuit T5 is always in the on-state.

On the other hand, at the step-down PWM comparator PWM1, when the voltage (the voltage of the output signal DF1 of the error amplifier ERA1) of the inverting input pin is higher than the voltage (the voltage of the triangular wave signal TW supplied from the triangular wave oscillator OSC) of the non-inverting input pin, the output signal Q1 is set to a high level, and the output signal /Q1 is set to a low level. Since the output signals Q1 and /Q1 of the step-down PWM comparator PWM1 are output as the control signals D1 and D2, when the voltage of the output signal DF1 of the error amplifier ERA1 is higher than the voltage of the triangular wave signal TW, the step-down main switching transistor T1 enters the on-state, and the step-down synchronous commutator circuit T2 enters the off-state.

At the step-down PWM comparator PWM1, when the voltage (the voltage of the output signal DF1 of the error amplifier ERA1) of the non-inverting input pin is lower than the voltage (the voltage of the triangular wave signal TW supplied from the triangular wave oscillator OSC) of the non-inverting input pin, the output signal Q1 is set to a low level, and the output signal /Q1 is set to a high level. Since the output signals Q1 and /Q1 of the step-down PWM comparator PWM1 are output as the control signals D1 and D2, when the voltage of the output signal DF1 of the error amplifier ERA1 is lower than the voltage of the triangular wave signal TW, the step-down main switching transistor T1 enters the off-state, and the step-down synchronous commutator circuit T2 enters the on-state.

When the step-down main switching transistor T1 enters the on-state, the step-down synchronous commutator circuit T2 enters the off-state and an electric current is supplied to a load from the input side via the choke coil L1. Since the voltage difference between the input voltage Vi and the second output voltage Vo2 is applied across both ends of the choke coil L1, the current that flows through the choke coil L1 increases as time elapses and the current supplied to the load also increases as time elapses. In addition, as the current flows through the choke coil L1, energy is accumulated in the choke coil L1. Then, when the step-down main switching transistor T1 enters the off-state, the boost synchronous commutator circuit T2 enters the on-state and the energy accumulated in the choke coil L1 is discharged. At this time, the second output voltage Vo2 is expressed by expression (1) using the input voltage Vi, an on-period Ton of the step-down main switching transistor T1, and an off-period Toff of the step-down main switching transistor T1.

$$Vo2 = \{Ton/(Ton+Toff)\} \times Vi \qquad (1)$$

In addition, the current that flows through the choke coil L1 flows from the input side to the output side during the on-period of the step-down main switching transistor T1 and is supplied via the step-down synchronous commutator circuit T2 during the off-period of the step-down main switching transistor T1. Consequently, an average input current Ii is expressed by expression (2) using an output current Io, the on-period Ton of the step-down main switching transistor T1, and the off-period Toff of the step-down main switching transistor T1.

$$Ii = \{Ton/(Ton+Toff)\} \times Io \qquad (2)$$

Consequently, when the second output voltage Vo2 varies resulting from the variation of the input voltage Vi, it is possible to keep constant the second output voltage Vo2 by detecting the variation of the second output voltage Vo2 to control the ratio between on-period and off-period of the step-down main switching transistor T1. Similarly, when the second output voltage Vo2 varies resulting from the variation of the load, it is also possible to keep constant the second output voltage Vo2 by detecting the variation of the second output voltage Vo2 to control the ratio between on-period and off-period of the step-down main switching transistor T1. In this manner, in the DC-DC converter CNV of PWM control system, it is possible to control the second output voltage Vo2 by controlling the ratio between on-period and off-period of the step-down main switching transistor T1.

By the way, at the time of start of the DC-DC converter CNV, the second output voltage Vo2 is 0 V, and therefore, the voltage difference between the input voltage Vi and the second output voltage Vo2 becomes maximum and if it is assumed that the voltage of the first non-inverting input pin is lower than the voltage of the second non-inverting input pin at the error amplifier ERA1, the voltage of the output signal DF1 of the error amplifier ERA1 also becomes maximum. In this case, the pulse width (period of high level) of the output signal Q1 of the step-down PWM comparator becomes maximum and the on-period of the step-down main switching transistor T1 becomes maximum. In addition, a maximum current Ipeak that flows through the choke coil L1 is expressed by expression (3) using the input voltage Vi, the second output voltage Vo2, an inductance L of the choke coil L1, and the on-period Ton of the step-down main switching transistor T1.

$$Ipeak = \{(Vi-Vo2)/L\} \times Ton \qquad (3)$$

At the time of start of the DC-DC converter CNV, the second output voltage Vo2 is 0 V, and therefore, the voltage to be applied to the choke coil L1 becomes maximum and the on-period of the step-down main switching transistor T1 becomes maximum. Thus, it is known that an excessive inrush current occurs in the choke coil L1 and the step-down main switching transistor T1. This occurs because the DC-DC converter CNV attempts to raise second output voltage Vo2 from 0 V to a rated value (1.8 V) at a burst.

However, at the time of start of the DC-DC converter CNV, the soft-start capacitor CS is charged gradually by the constant-current circuit, and thereby, the voltage (the voltage of the second non-inverting input pin of the error amplifier ERA1) generated by the soft-start capacitor CS rises gradually from 0 V. Consequently, at the time of start of the DC-DC converter CNV, the error amplifier ERA1 generates the output signal DF1 by amplifying the voltage difference between the voltage of the second output voltage Vo2 divided by the resistors R3 and R4 and the voltage generated by the soft-start capacitor CS. At the time of start of the DC-DC converter CNV, since the second output voltage Vo2 is 0 V, the voltage of the output signal DF1 of the error amplifier ERA1 becomes minimum and the pulse width of the output signal Q1 of the step-down PWM comparator PWM1 also becomes minimum. Because of this, the on-period of the step-down main switching transistor T1 becomes minimum and the inrush current is prevented.

In addition, the voltage generated by the soft-start capacitor CS is a voltage that defines the second output voltage Vo2 and rises gradually with a predetermined rising slope. Because of this, the second output voltage Vo2 also rises in proportion thereto. Consequently, the rising slope of the second output voltage Vo2 is defined by the rising slope of the voltage generated by the soft-start capacitor CS. When the voltage generated by the soft-start capacitor CS rises and becomes higher than the reference voltage Ve2, the error amplifier ERA1 generates the output voltage DF1 by amplifying the voltage difference between the voltage of the second output voltage Vo2 divided by the resistors R3 and R4 and the reference voltage Ve2. Consequently, after the voltage generated by the soft-start capacitor CS has reached the reference voltage Ve2, the second output voltage Vo2 is defined by the reference voltage Ve2. By the way, at the time of termination of the DC-DC converter CNV, the soft-start capacitor CS is discharged gradually by a discharging resistor and the voltage generated by the soft-start capacitor CS drops gradually, and therefore, it is possible to reduce the second output voltage Vo2 gradually.

Figure 6:
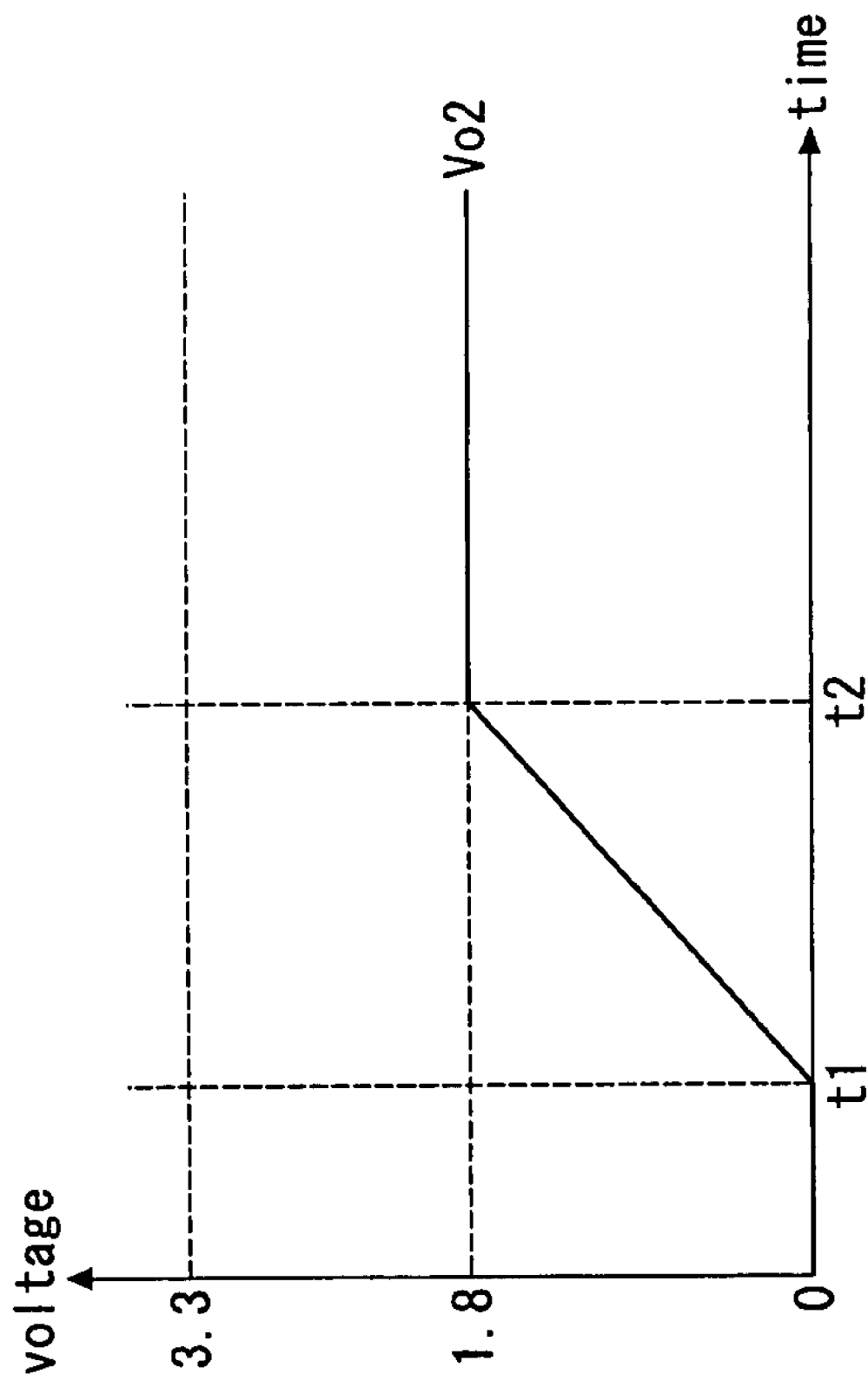
FIG. 6 is an explanatory diagram showing rising characteristics (first mode) of a second output voltage.

FIG. 6 shows the rising characteristics (first mode) of the second output voltage Vo2. At time t1, when the DC-DC converter CNV is started, the soft-start capacitor CS is charged gradually by the constant-current circuit. Due to this, the voltage generated by the soft-start capacitor CS rises as time elapses. Accompanying this, the second output voltage Vo2 also rises as time elapses. At time t2, when the voltage generated by the soft-start capacitor CS has reached the reference voltage Ve2, the second output voltage Vo2 is controlled to keep constant by the reference voltage Ve2 thereafter.

Figure 7:
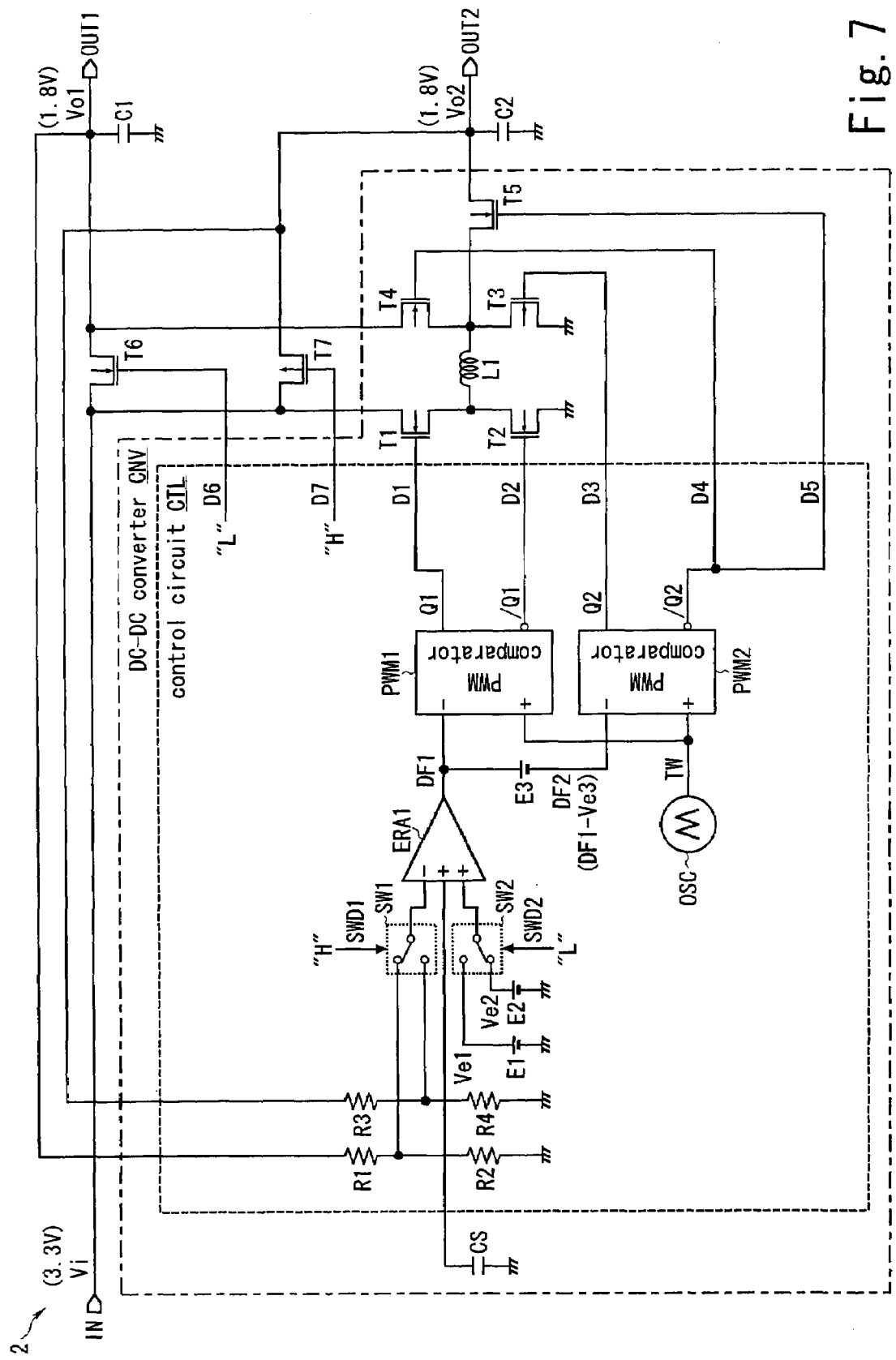
FIG. 7 is an explanatory diagram showing an operation (second mode) of the power supply circuit.

FIG. 7 shows the operation (second mode) of the power supply circuit 2. When 3.3 V is supplied as the input voltage Vi and 1.8 V is requested as the operation voltage of the non-volatile memory 3, the control signal D6 is set to a low level. Due to this, the first bypass switch circuit T6 is always in the off-state. In addition, the control signal SWD1 is set to a high level. Due to this, the switch circuit SW1 couples the coupling node of the resistors R1 and R2 to the inverting input pin of the error amplifier ERA1. The output signal /Q2 of the boost PWM comparator PWM2 is not only output as the control signal D5 but also output as the control signal D4. Since the operation other than this is the same as that in the first mode of the power supply circuit 2, duplicated description will be omitted here.

Figure 8:
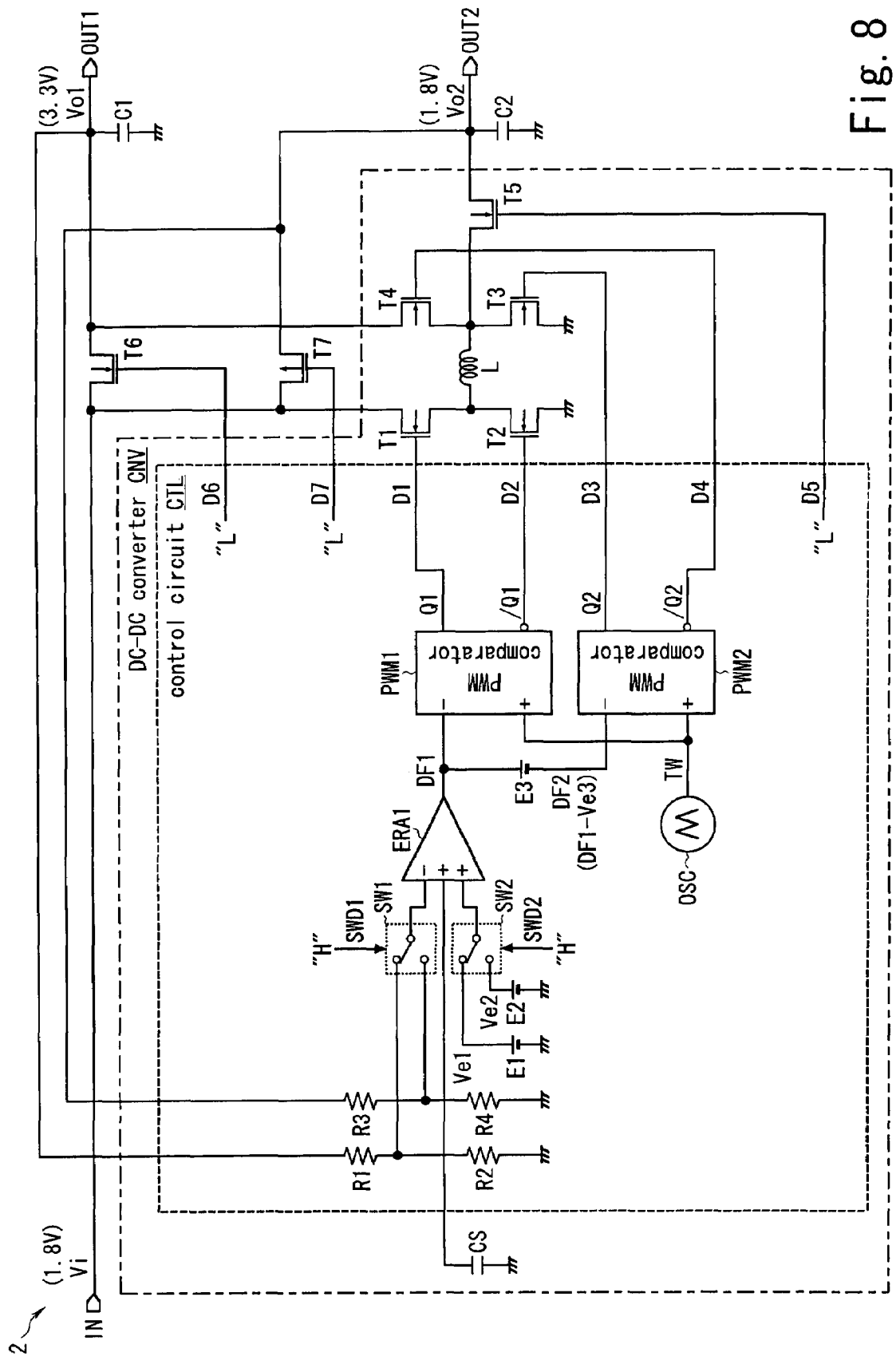
FIG. 8 is an explanatory diagram showing an operation (third mode) of the power supply circuit.

FIG. 8 shows the operation (third mode) of the power supply circuit 2. When 1.8 V is supplied as the input voltage Vi and 3.3 V is requested as the operation voltage of the non-volatile memory 3, the control signals D5 and D7 are set to a low level. Due to this, the boost synchronous commutator circuit T5 is always in the off-state and the second bypass switch circuit T7 is always in the on-state. Consequently, the input voltage Vi is output as the second output voltage Vo2. In addition, the control signal D6 is set to a low level. Due to this, the first bypass switch circuit T6 is always in the off-state.

The control signals SWD1 and SWD2 are set to a high level. Consequently, the switch circuit SW1 couples the coupling node of the resistors R1 and R2 to the inverting input pin of the error amplifier ERA1 and the switch circuit SW2 couples the output pin of the voltage generator E1 to the first non-inverting input pin of the error amplifier ERA1. Since the soft-start capacitor CS is charged by the constant-current circuit during the operation of the DC-DC converter CNV, the voltage of the second non-inverting input pin is higher than the voltage of the first non-inverting input pin at the error amplifier ERA1. Consequently, the error amplifier ERA1 generates the output signal DF1 by amplifying the voltage difference between the voltage of the first output voltage Vo1 divided by the resistors R1 and R2 and the reference voltage Ve1.

The step-down PWM comparator PWM1 sets the output signal /Q1 to a low level as well as setting the output signal Q1 to a high level when the voltage of the output signal DF1 of the error amplifier ERA1 is higher than the triangular wave signal TW supplied from the triangular wave oscillator OSC, and sets the output signal /Q1 to a high level as well as setting the output signal Q1 to a low level when the voltage of the output signal DF1 of the error amplifier ERA1 is lower than the voltage of the triangular wave signal TW. The output signals Q1 and /Q1 of the step-down PWM comparator PWM1 are output as the control signals D1 and D2.

The boost PWM comparator PWM2 sets the output signal /Q2 to a low level as well as setting the output signal Q2 to a high level when the voltage (the voltage obtained by subtracting the offset voltage Ve3 from the voltage of the output signal DF1 of the error amplifier ERA1) of the output signal DF2 of the voltage generator E3 is higher than the triangular wave signal TW supplied from the triangular wave oscillator OSC, and sets the output signal /Q2 to a high level as well as setting the output signal Q2 to a low level when the voltage of the output signal DF2 of the voltage generator E3 is lower than the voltage of the triangular wave signal TW. The output signals Q2 and /Q2 of the boost PWM comparator PWM2 are output as the control signals D3 and D4.

Figure 9:
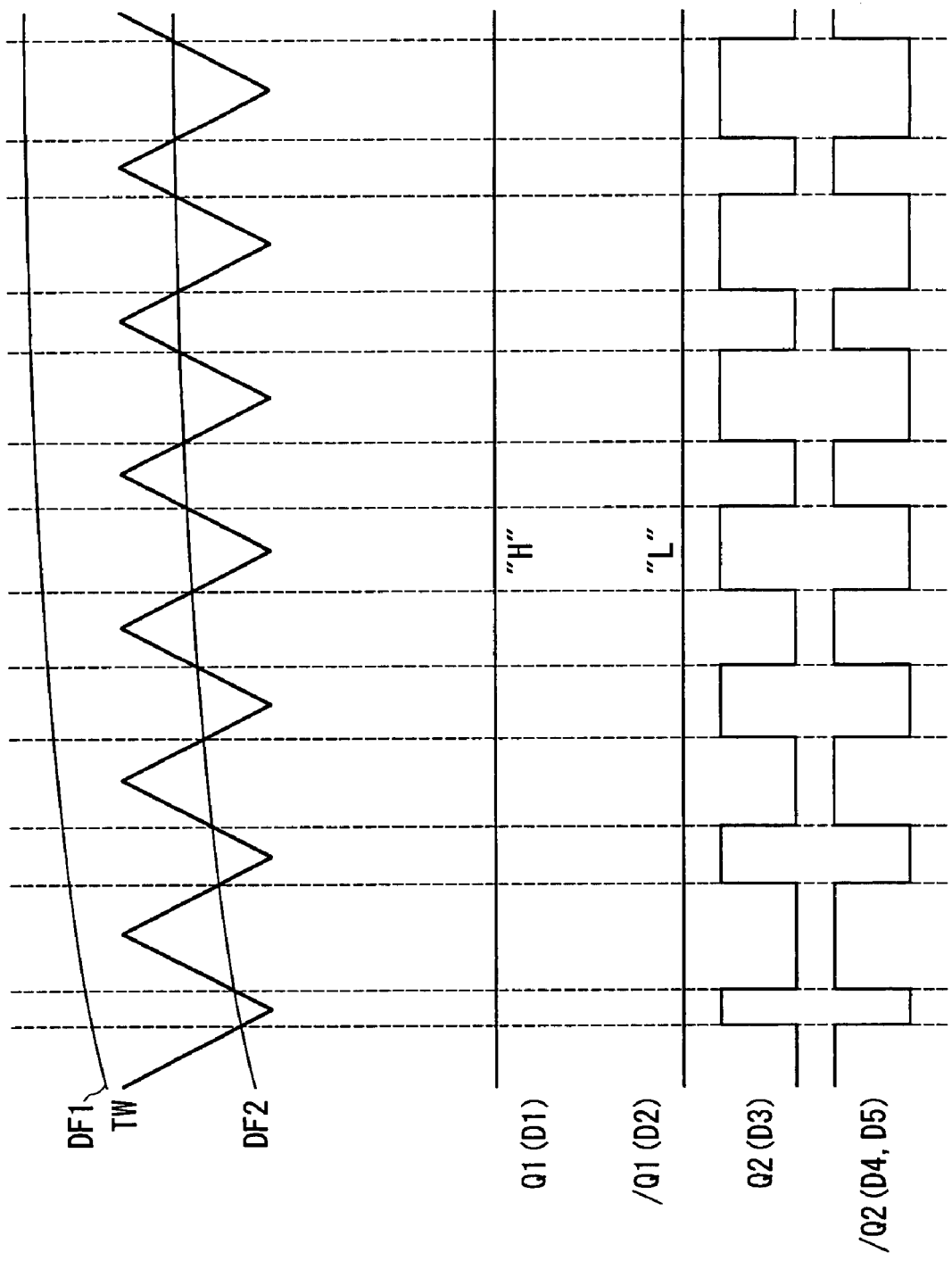
FIG. 9 is an explanatory diagram showing an operation (third mode) of the step-down PWM comparator and the boost PWM comparator.

FIG. 9 shows the operation (third mode) of the step-down PWM comparator PWM1 and the boost PWM comparator PWM2. When 1.8 V is supplied as the input voltage Vi and 3.3 V is requested as the operation voltage of the non-volatile memory 3, since the voltage (the voltage of the output signal DF1 of the error amplifier ERA1) of the inverting input pin is always higher than the voltage (the voltage of the triangular wave signal TW supplied from the triangular wave oscillator OSC) of the non-inverting input pin at the step-down PWM comparator PWM1, the output signal Q1 is always set to a high level and the output signal /Q1 is always set to a low level (a state of 100% duty). Since the output signal Q1 of the step-down PWM comparator PWM1 is output as the control signal D1, the step-down main switching transistor T1 is always in the on-state. In addition, since the output signal /Q1 of the step-down PWM comparator PWM1 is output as the control signal D2, the step-down synchronous commutator circuit T2 is always in the off-state.

On the other hand, at the boost PWM comparator PWM2, when the voltage (the voltage of the output signal DF2 of the voltage generator E3) of the inverting input pin is higher than the voltage (the voltage of the triangular wave signal TW supplied from the triangular wave oscillator OSC) of the non-inverting input pin, the output signal Q2 is set to a high level and, the output signal /Q2 is set to a low level. Since the output signals Q2 and /Q2 of the boost PWM comparator PWM2 are output as the control signals D3 and D4, when the voltage of the output signal DF2 of the voltage generator E3 is higher than the voltage of the triangular wave signal TW, the boost main switching transistor T3 enters the on-state and the boost synchronous commutator circuit T4 enters the off-state.

At the boost PWM comparator PWM2, when the voltage (the voltage of the output signal DF2 of the voltage generator E3) of the inverting input pin is lower than the voltage (the voltage of the triangular wave signal TW supplied from the triangular wave oscillator OSC) of the non-inverting input pin, the output signal Q2 is set to a low level and the output signal /Q2 is set to a high level. Since the output signals Q2 and /Q2 of the boost PWM comparator PWM2 are output as the control signals D3 and D4, when the voltage of the output signal DF2 of the voltage generator E3 is lower than the voltage of the triangular wave signal TW, the boost main switching transistor T3 enters the off-state and the boost synchronous commutator circuit T4 enters the on-state.

When the boost main switching transistor T3 enters the on-state, the boost synchronous commutator circuit T4 enters the off-state and an electric current is supplied to the choke coil L1 from the input side. Since the input voltage Vi is applied across both ends of the choke coil L1, the current that flows through the choke coil L1 increases as time elapses and the current supplied to the load also increases as time elapses. In addition, as the current flows through the choke coil L1, energy is accumulated in the choke coil L1. Then, when the boost main switching transistor T3 enters the off-state, the boost synchronous commutator circuit T4 enters the on-state and the energy accumulated in the choke coil L1 is discharged.

During the on-period of the boost main switching transistor T3, a current IL that flows through the choke coil L1 is expressed by expression (4) using the input voltage Vi, the inductance L of the choke coil L1, and the on-period Ton of the boost main switching transistor T3 and increases as time elapses.

$$IL=(Vi/L) \times Ton \qquad (4)$$

In addition, during the off-period of the boost main switching transistor T3, the current IL that flows through the choke coil L1 is expressed by expression (5) using the input voltage Vi, the first output voltage Vo1, the inductance L of the choke coil L1, and the off-period Toff of the boost main switching transistor T3 and reduces as time elapses.

$$IL=\{(Vo1-Vi)/L\} \times Toff \qquad (5)$$

Since the current IL in the expression (4) is equal to that in the expression (5), the first output voltage Vo1 is expressed by expression (6) using the input voltage Vi, the on-period Ton of the boost main switching transistor T3, and the off-period Toff of the boost main switching transistor T3.

$$Vo1=\{(Ton+Toff)/Toff\} \times Vi \qquad (6)$$

Consequently, when the first output voltage Vo1 varies resulting from the variation of the input voltage Vi, it is possible to keep constant the first output voltage Vo1 by detecting the variation of the first output voltage Vo1 to control the ratio between on-period and off-period of the boost main switching transistor T3. Similarly, when the first output voltage Vo1 varies resulting from the variation of the load, it is also possible to keep constant the first output voltage Vo1 by detecting the variation of the first output voltage Vo1 to control the ratio between on-period and off-period of the boost main switching transistor T3. In this manner, in the DC-DC converter CNV of PWM control system, it is possible to control the first output voltage Vo1 by controlling the ratio between on-period and off-period of the boost main switching transistor T3.

Figure 10:
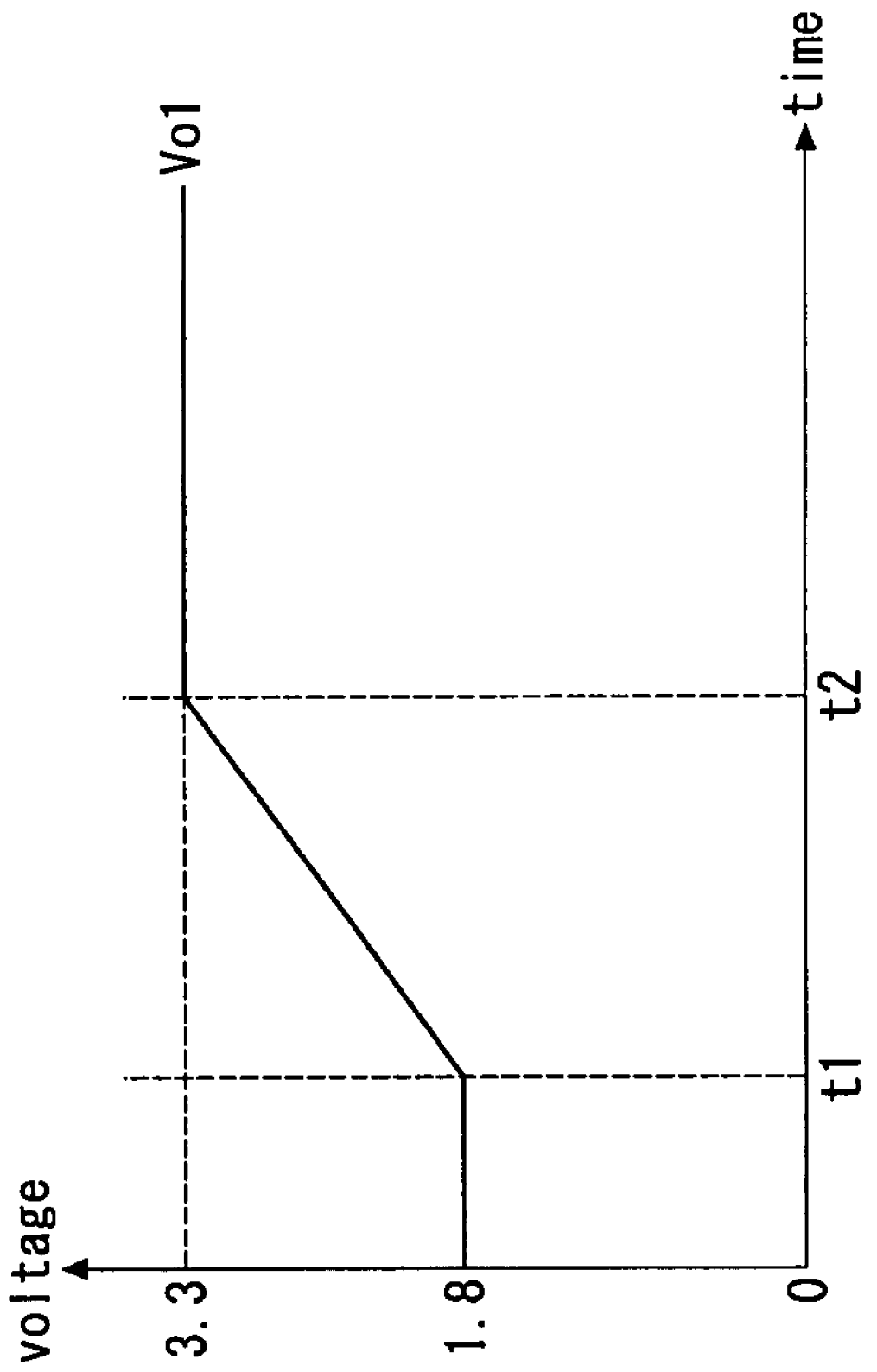
FIG. 10 is an explanatory diagram showing rising characteristics (third mode, without soft-start control) of a first output voltage.

By the way, when the DC-DC converter CNV is started, if it is assumed that the voltage of the first non-inverting input pin is lower than the voltage of the second non-inverting input pin at the error amplifier ERA1, the input pin IN and the first output pin OUT1 of the power supply circuit 2 are coupled via the boost synchronous commutator circuit T4, and therefore, the input voltage Vi flows through as the first output voltage Vo1 and an excessive inrush current occurs. In addition, since the input voltage Vi flows through as the first output voltage Vo1, the rising characteristics of the first output voltage Vo1 will be like the rising characteristics shown in FIG. 10. Consequently, a control to raise the first output voltage Vo1 from 0 V to the rated value (3.3 V) in a predetermined time is impossible.

However, since the voltage generated by the soft-start capacitor CS is supplied to the second non-inverting input pin of the error amplifier ERA1, the DC-DC converter CNV starts as a step-down type DC-DC converter, as will be described later, and makes transition to a boost type DC-DC converter when the first output voltage Vo1 becomes equal to the input voltage Vi. Due to this, it is made possible to prevent an inrush current and control the rising slope of the first output voltage Vo1.

Figure 11:
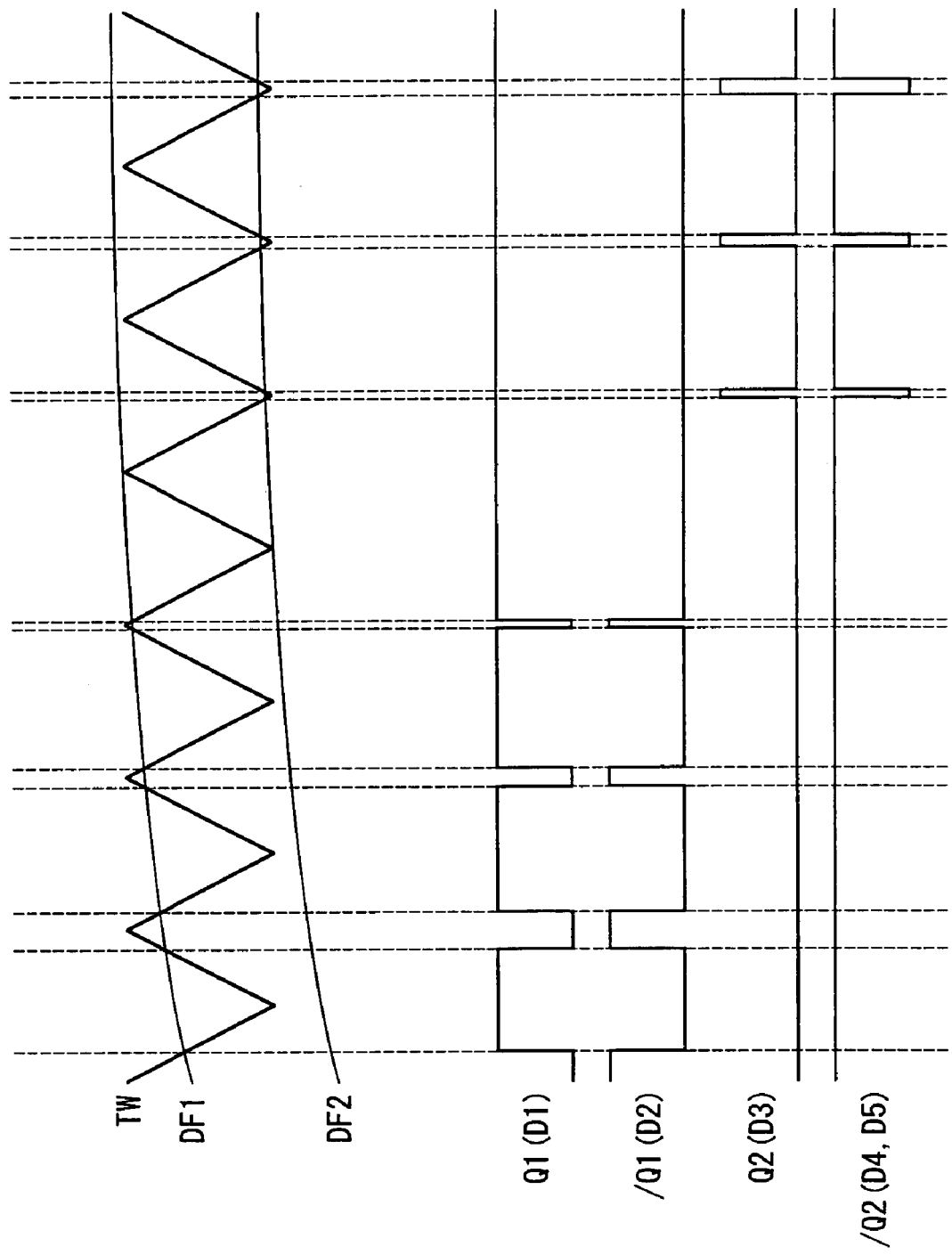
FIG. 11 is an explanatory diagram showing an operation (third mode) of the step-down PWM comparator and the boost PWM comparator at the time of start of a DC-DC converter.

FIG. 11 shows the operation (third mode) of the step-down PWM comparator PWM1 and the boost PWM comparator PWM2 at the time of start of the DC-DC converter CNV. At the time of start of the DC-DC converter CNV, the soft-start capacitor CS is charged gradually by the constant-current circuit and thereby the voltage (the voltage of the second non-inverting input pin of the error amplifier ERA1) generated by the soft-start capacitor CS gradually rises from 0 V. Consequently, at the time of start of the DC-DC converter CNV, the error amplifier ERA1 generates the output signal DF1 by amplifying the voltage difference between the voltage of the first output voltage Vo1 divided by the resistors R1 and R2 and the voltage generated by the soft-start capacitor CS.

At this time, since the voltage (the voltage of the output signal DF2 of the voltage generator E3) of the inverting input pin is always lower than the voltage (the voltage of the triangular wave signal TW supplied from the triangular wave oscillator OSC) of the non-inverting input pin at the boost PWM comparator PWM2, the output signal Q2 is always set to a low level and the output signal /Q2 is always set to a high level (a state of 0% duty). Since the output signal Q2 of the boost PWM comparator PWM2 is output as the control signal D3, the boost main switching transistor T3 is always in the off-state. In addition, since the output signal /Q2 of the boost PWM comparator PWM2 is output as the control signal D5, the boost synchronous commutator circuit T5 is always in the on-state.

On the other hand, at the step-down PWM comparator PWM1, when the voltage (the voltage of the output signal DF1 of the error amplifier ERA1) of the inverting input pin is higher than the voltage (the voltage of the triangular wave signal TW supplied from the triangular wave oscillator OSC) of the non-inverting input pin, the output signal Q1 is set to a high level and the output signal /Q1 is set to a low level. Since the output signals Q1 and /Q1 of the step-down PWM comparator PWM1 are output as the control signals D1 and D2, when the voltage of the output signal DF1 of the error amplifier ERA1 is higher than the voltage of the triangular wave signal TW, the step-down main switching transistor T1 enters the on-state and the step-down synchronous commutator circuit T2 enters the off-state.

At the step-down PWM comparator PWM1, when the voltage (the voltage of the output signal DF1 of the error amplifier ERA1) of the non-inverting input pin is lower than the voltage (the voltage of the triangular wave signal TW supplied from the triangular wave oscillator OSC) of the non-inverting input pin, the output signal Q1 is set to a low level and at the same time, the output signal /Q1 is set to a high level. Since the output signals Q1 and /Q1 of the step-down PWM comparator PWM1 are output as the control signals D1 and D2, when the voltage of the output signal DF1 of the error amplifier ERA1 is lower than the voltage of the triangular wave signal TW, the step-down main switching transistor T1 enters the off-state and the step-down synchronous commutator circuit T2 enters the on-state.

At the time of start of the DC-DC converter CNV, the first output voltage Vo1 is 0 V and therefore the voltage of the output signal DF1 of the error amplifier ERA1 becomes minimum and the pulse width of the output signal Q1 of the step-down PWM comparator PWM1 also becomes minimum. Because of this, the on-period of the step-down main switching transistor T1 becomes minimum and the inrush current is prevented. In addition, the voltage generated by the soft-start capacitor CS is a voltage that defines the first output voltage Vo1 and rises gradually with a predetermined rising slope. Because of this, the first output voltage Vo1 also rises in proportion thereto. Consequently, the rising slope of the first output voltage Vo1 is defined by the rising slope of the voltage generated by the soft-start capacitor CS.

When the voltage generated by the soft-start capacitor CS becomes higher than the voltage at which the first output voltage Vo1 becomes equal to the input voltage Vi, the voltage of the output voltage DF1 of the error amplifier ERA1 becomes higher than the voltage of the triangular wave signal TW. Since the voltage (the voltage of the output signal DF1 of the error amplifier ERA1) of the inverting input pin is always higher than the voltage (the voltage of the triangular wave signal TW from the triangular wave oscillator OSC) supplied to the non-inverting input pin at the step-down PWM comparator PWM1, the output signal Q1 is always set to a high level and the output signal /Q1 is always set to a low level (a state of 100% duty). Since the output signal Q1 of the step-down PWM comparator PWM1 is output as the control signal D1, the step-down main switching transistor T1 is always in the on-state. In addition, since the output signal /Q1 of the step-down PWM comparator PWM1 is output as the control signal D2, the step-down synchronous commutator circuit T2 is always in the off-state.

On the other hand, when the voltage generated by the soft-start capacitor CS becomes higher than the voltage at which the first output voltage Vo1 becomes equal to the input voltage Vi, the voltage (the voltage obtained by subtracting the offset voltage Ve3 from the voltage of the output signal DF1 of the error amplifier ERA1) of the output signal DF2 of the voltage generator E3 comes to intersect with the voltage of the triangular wave signal TW. At the boost PWM comparator PWM2, when the voltage (the voltage of the output signal DF2 of the voltage generator E3) of the inverting input pin is higher than the voltage (the voltage of the triangular wave signal TW supplied from the triangular wave oscillator OSC) of the non-inverting input pin, the output signal Q2 is set to a high level and the output signal /Q2 is set to a low level. Since the output signals Q2 and /Q2 of the boost PWM comparator PWM2 are output as the control signals D3 and D4, when the voltage of the output signal DF2 of the voltage generator E3 is higher than the voltage of the triangular wave signal TW, the boost main switching transistor T3 enters the on-state and the boost synchronous commutator circuit T4 enters the off-state.

At the boost PWM comparator PWM2, when the voltage (the voltage of the output signal DF2 of the voltage generator E3) of the inverting input pin is lower than the voltage (the voltage of the triangular wave signal TW supplied from the triangular wave oscillator OSC) of the non-inverting input pin, the output signal Q2 is set to a low level and the output signal /Q2 is set to a high level. Since the output signals Q2 and /Q2 of the boost PWM comparator PWM2 are output as the control signals D3 and D4, when the voltage of the output signal DF2 of the voltage generator E3 is lower than the voltage of the triangular wave signal TW, the boost main switching transistor T3 enters the off-state and the boost synchronous commutator circuit T4 enters the on-state.

When the voltage generated by the soft-start capacitor CS rises and becomes higher than the reference voltage Ve1, the error amplifier ERA1 generates the output voltage DF1 by amplifying the voltage difference between the voltage of the first output voltage Vo1 divided by the resistors R1 and R2 and the reference voltage Ve1. Consequently, after the voltage generated by the soft-start capacitor CS has reached the reference voltage Ve1, the first output voltage Vo1 is defined by the reference voltage Ve1. By the way, at the time of termination of the DC-DC converter CNV, the soft-start capacitor CS is discharged gradually by a discharging resistor and the voltage generated by the soft-start capacitor CS drops gradually, and therefore, it is possible to reduce the first output voltage Vo1 gradually.

Figure 12:
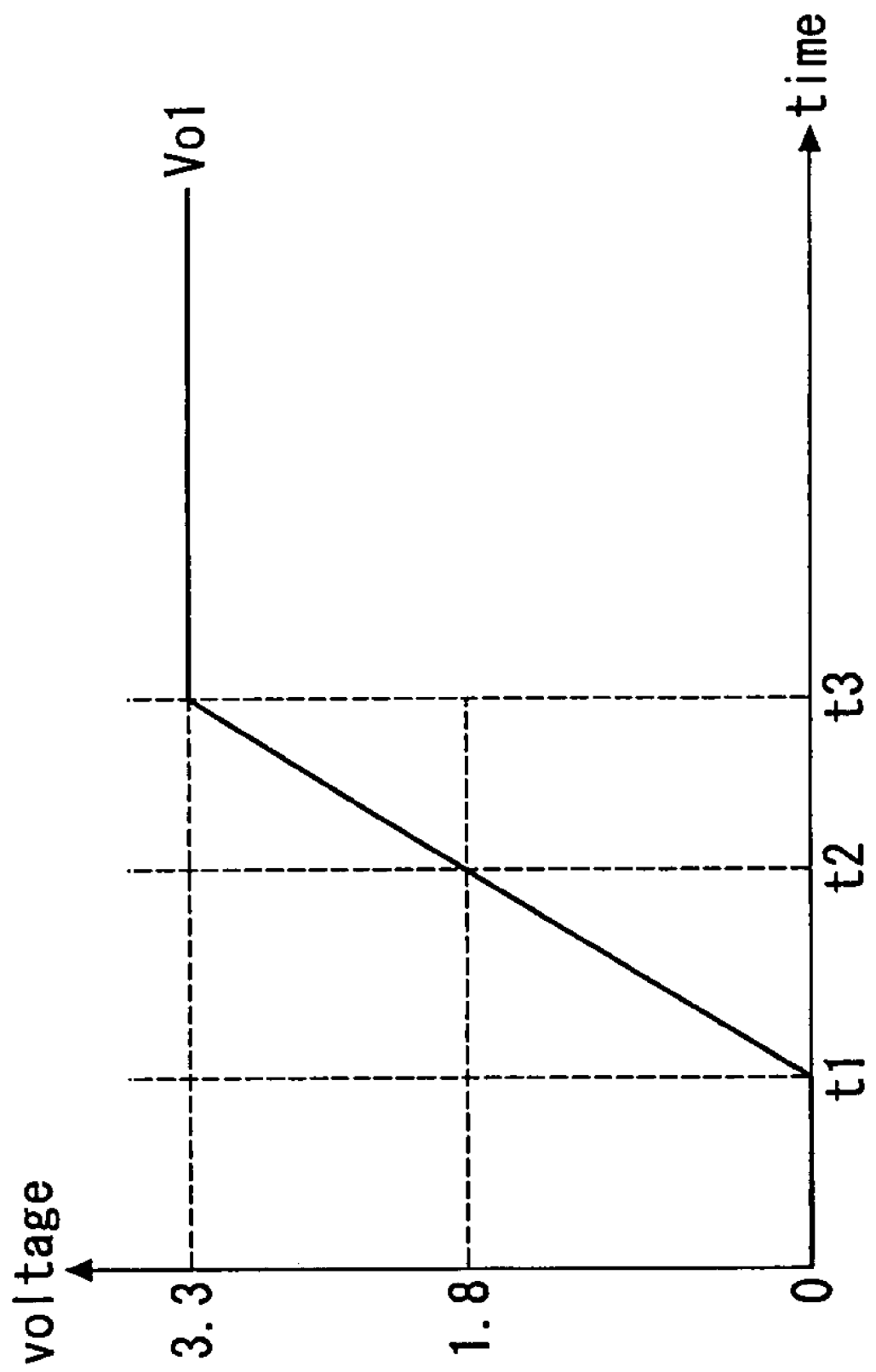
FIG. 12 is an explanatory diagram showing rising characteristics (third mode, with soft-start control) of the first output voltage.

FIG. 12 shows the rising characteristics (third mode) of the first output voltage Vo1. At time t1, when the DC-DC converter CNV is started, the soft-start capacitor CS is charged gradually by the constant-current circuit. Due to this, the voltage supplied from the soft-start capacitor CS rises as time elapses. Accompanying this, the first output voltage Vo1 also rises as time elapses. During this time, the DC-DC converter CNV operates as the step-down type DC-DC converter.

At time t2, when the voltage generated by the soft-start capacitor CS becomes higher than the voltage at which the first output voltage Vo1 becomes equal to the input voltage Vi, the DC-DC converter CNV makes transition from the step-down type DC-DC converter to the boost type DC-DC converter. The first output voltage Vo1 continues to rise accompanying the rise in the voltage generated by the soft-start capacitor CS. At time t3, when the voltage generated by the soft-start capacitor CS has reached the reference voltage Ve1, the first output voltage Vo1 is controlled to keep constant by the reference voltage Ve1 thereafter.

Figure 13:
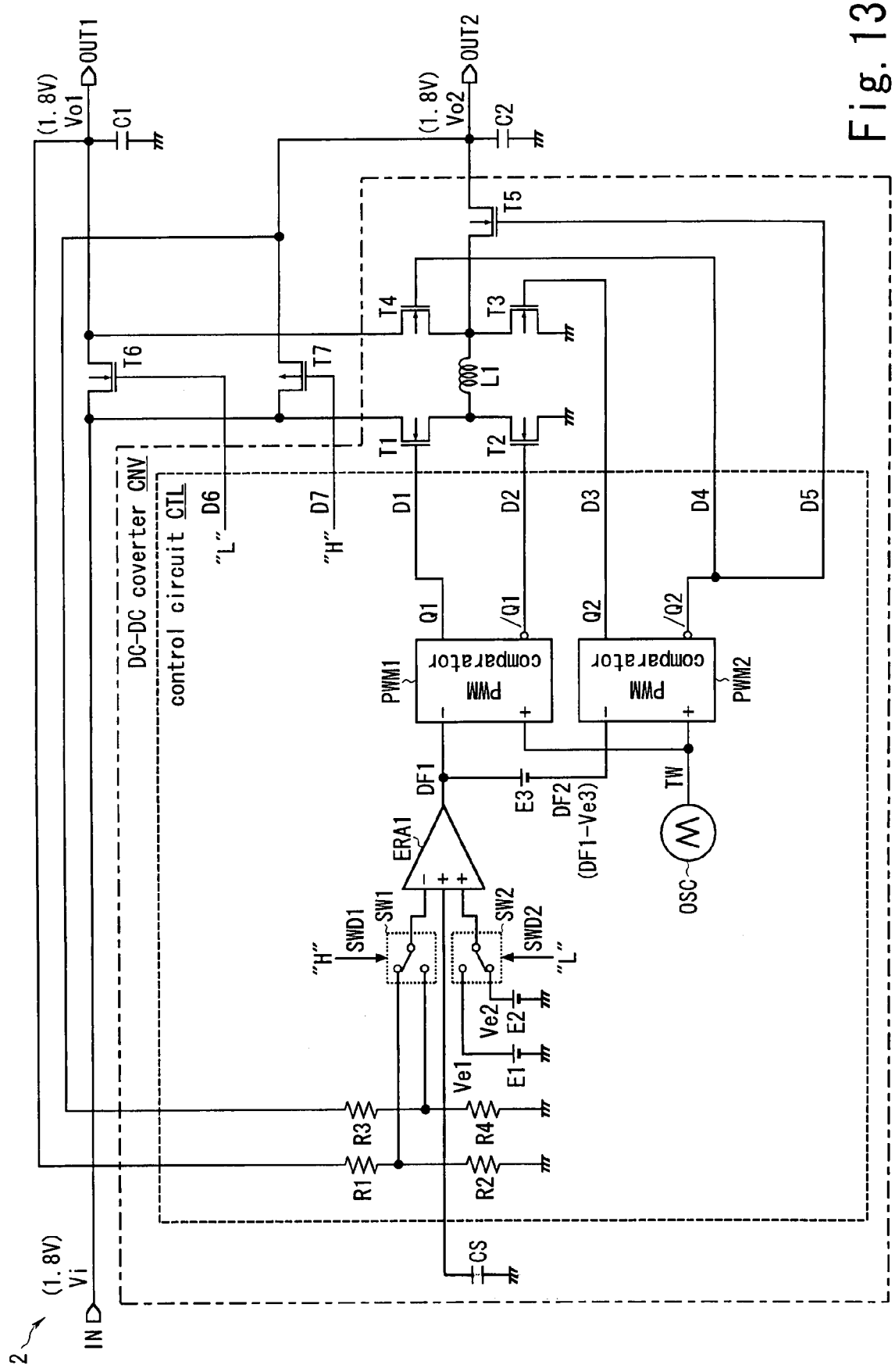
FIG. 13 is an explanatory diagram showing an operation (fourth mode) of the power supply circuit.

FIG. 13 shows the operation (fourth mode) of the power supply circuit 2. When 1.8 V is supplied as the input voltage Vi and 1.8 V is requested as the operation voltage of the non-volatile memory 3, the control signal D7 is fixed to a high level. Due to this, the second bypass switch circuit T7 is always in the off-state. In addition, the control signal SWD2 is fixed to a low level. Because of this, the switch circuit SW2 couples the output pin of the voltage generator E2 to the first non-inverting input pin of the error amplifier ERA1. The output signal /Q2 of the boost PWM comparator PWM2 is not only output as the control signal D4 but also output as the control signal D5. Since the operation other than this is the same as that in the third mode of the power supply circuit 2, duplicated description will be omitted here.

Figure 14:
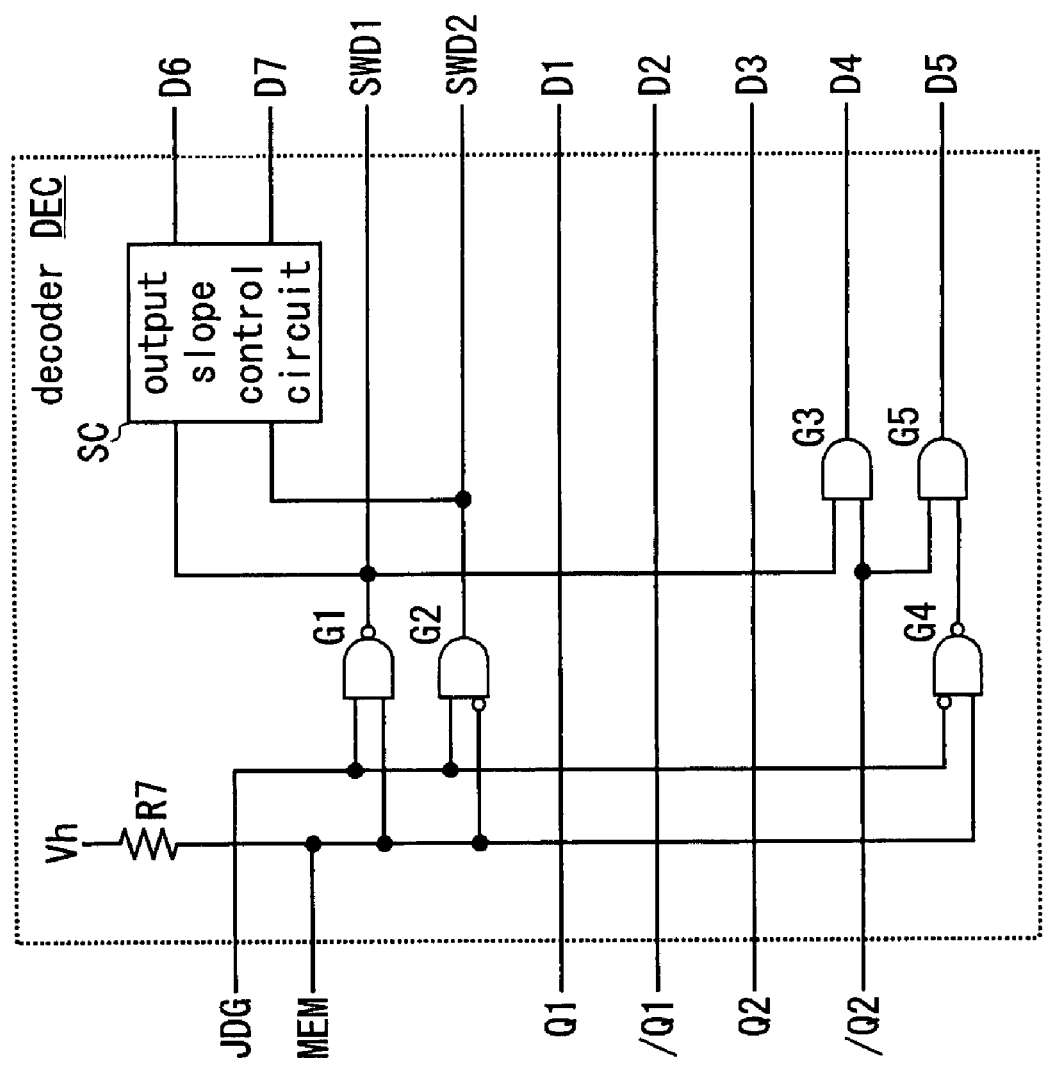
FIG. 14 is an explanatory diagram showing a configuration of the decoder.

FIG. 14 shows the configuration of the decoder DEC. The decoder DEC is configured so as to include a resistor R7, gate circuits G1 to G5, and an output slope control circuit SC in order to embody the operation shown in FIG. 3. One pin of the resistor R7 is coupled to the supply line of a power supply voltage Vh for a logic circuit (the voltage of the input voltage Vi raised by a charge pump circuit etc.). The other pin of the resistor R7 is coupled to the switch circuit SWM (FIG. 2) via the signal line of the memory voltage request signal MEM. Due to this, the memory voltage request signal MEM is set to a high level when the switch circuit SWM is in the off-state and is set to a low level when the switch circuit SWM is in the on-state.

The gate circuit G1 sets the control signal SWD1 to a low level when the output signal JDG of the voltage comparator CMP is set to a high level and the memory voltage request signal MEM is set to a high level (when 3.3 V is supplied as the input voltage Vi and 3.3 V is requested as the operation voltage of the non-volatile memory 3). Under other conditions, the gate circuit G1 sets the control signal SWD1 to a high level.

The gate circuit G2 sets the control signal SWD2 to a high level when the output signal JDG of the voltage comparator CMP is set to a low level and the memory voltage request signal MEM is set to a high level (when 1.8 V is supplied as the input voltage Vi and 3.3 V is requested as the operation voltage of the non-volatile memory 3). Under other conditions, the gate circuit G2 sets the control signal SWD2 to a low level.

The gate circuit G3 sets the control signal D4 to a low level when the output signal of the gate circuit G1 is set to a low level (when 3.3 V is supplied as the input voltage Vi and 3.3 V is requested as the operation voltage of the non-volatile memory 3). The gate circuit G3 outputs the output signal /Q2 of the boost PWM comparator PWM2 as the control signal D4 when the output signal of the gate circuit G1 is set to a high level.

The gate circuit G4 sets the output signal to a low level when the output signal JDG of the voltage comparator CMP is set to a low level and the memory voltage request signal MEM is set to a high level (when 1.8 V is supplied as the input voltage Vi and 3.3 V is requested as the operation voltage of the non-volatile memory 3). Under other conditions, the gate circuit G4 sets the output signal to a high level.

The gate circuit G5 sets the control signal D5 to a low level when the output signal of the gate circuit G4 is set to a low level (when 1.8 V is supplied as the input voltage Vi and 3.3 V is requested as the operation voltage of the non-volatile memory 3). The gate circuit G5 outputs the output signal /Q2 of the boost PWM comparator PWM2 as the control signal D5 when the output signal of the gate circuit G4 is set to a high level.

The output slope control circuit SC sets the control signal D6 to a high level when the output signal (control signal SWD1) of the gate circuit G1 is set to a low level (when 3.3 V is supplied as the input voltage Vi and 3.3 V is requested as the operation voltage of the non-volatile memory). By the way, as will be described later using FIG. 15, the output slope control circuit SC controls the voltage of the control signal D6 so as to realize simultaneous activation of the first output voltage Vo1 and the second output voltage Vo2 when the output signal of the gate circuit G1 is set to a low level. The output slope control circuit SC sets the control signal D6 to a low level when the output signal of the gate circuit G1 is set to a high level.

The output slope control circuit SC sets the control signal D7 to a low level when the output signal (control signal SWD2) of the gate circuit G2 is set to a high level (when 1.8 V is supplied as the input voltage Vi and 3.3 V is requested as the operation voltage of the non-volatile memory). By the way, as will be described later using FIG. 15, the output slope control circuit SC controls the voltage of the control signal D7 so as to realize simultaneous activation of the first output voltage Vo1 and the second output voltage Vo2 when the output signal of the gate circuit G2 is set to a high level. The output slope control circuit SC sets the control signal D7 to a high level when the output signal of the gate circuit G2 is set to a low level.

Figure 15:
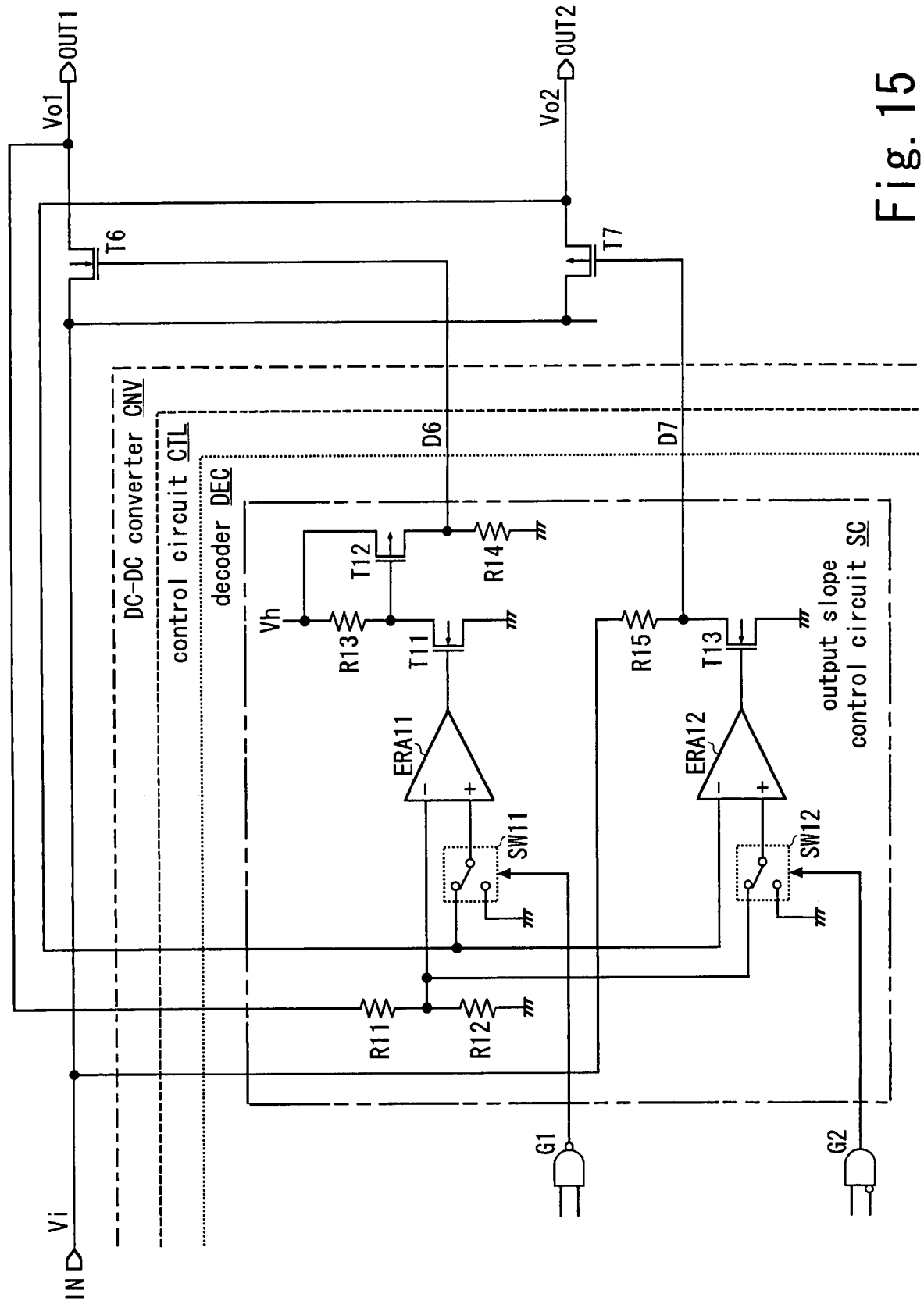
FIG. 15 is an explanatory diagram showing a configuration of an output slope control circuit.
Figure 16:
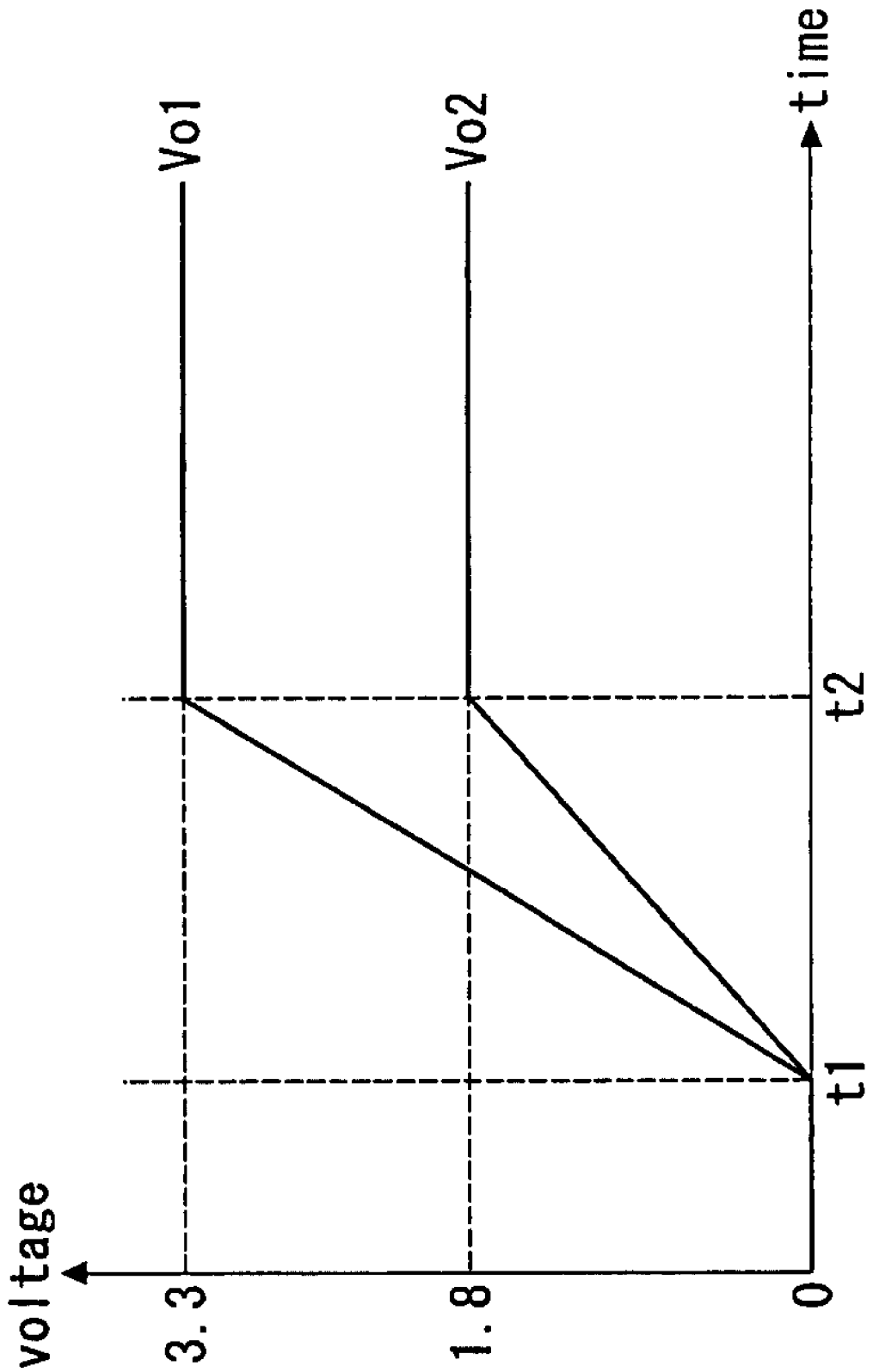
FIG. 16 is an explanatory diagram showing how the first and the second output voltages are activated simultaneously.

FIG. 15 shows the configuration of the output slope control circuit SC. FIG. 16 shows the simultaneous activation of the first output voltage Vo1 and the second output voltage Vo2. The output slope control circuit SC is configured so as to include resistors R11 to R15, switch circuits SW11 and SW12, error amplifiers ERA11 and ERA 12, and transistors T11 to T13. One pin of the resistor R11 is coupled to the first output pin OUT1 of the power supply circuit 2. The other pin of the resistor R11 is coupled to one pin of the resistor R12. The other pin of the resistor R12 is coupled to the ground line.

The switch circuit SW11 couples the second output pin OUT 2 of the power supply circuit 2 to the non-inverting input pin of the error amplifier ERA11 when the output signal (control signal SWD1) of the gate circuit G1 is set to a low level (3.3 V is supplied as the input voltage Vi and 3.3 V is requested as the operation voltage of the non-volatile memory 3). The switch circuit SW11 couples the ground line to the non-inverting input pin of the error amplifier ERA11 when the output signal of the gate circuit G1 is set to a high level.

The error amplifier ERA11 receives the voltage (the voltage of the first output voltage Vo1 divided by the resistors R11 and R12) of the coupling node of the resistors R11 and R12 at the inverting input pin and receives the voltage supplied via the switch circuit SW11. The error amplifier ERA11 generates an output signal by amplifying the voltage difference between the voltage of the coupling node of the resistors R11 and R12 and the voltage supplied via the switch circuit SW11. The resistor R13 and the transistor T11 (n-type transistor) are coupled in series between the supply line of the power supply voltage Vh for a logic circuit and the ground line. The control pin of the transistor T11 receives the output signal of the error amplifier ERA11. The transistor 12 (p-type transistor) and the resistor R14 are coupled in series between the supply line of the power supply voltage Vh for a logic circuit and the ground line. The control pin of the transistor T12 is coupled to the coupling node of the resistor R13 and the transistor T11. The coupling node of the transistor T12 and the resistor R14 is coupled to the control pin of the first bypass switch circuit T6. In other words, the signal generated at the coupling node of the transistor T12 and the resistor R14 is supplied to the control pin of the first bypass switch circuit T6 as the control signal D6.

The switch circuit SW12 couples the coupling node of the resistors R11 and R12 to the non-inverting input pin of the error amplifier ERA12 when the output signal (control signal SWD2) of the gate circuit G2 is set to a high level (1.8 V is supplied as the input voltage Vi and 3.3 V is requested as the operation voltage of the non-volatile memory 3). The switch circuit SW12 couples the ground line to the non-inverting input pin of the error amplifier ERA12 when the output signal of the gate circuit G2 is set to a low level.

The error amplifier ERA12 receives the second output voltage Vo2 at the inverting input pin and receives the voltage supplied via the switch circuit SW12 at the non-inverting input pin. The error amplifier ERA12 generates an output signal by amplifying the voltage difference between the second output voltage Vo2 and the voltage supplied via the switch circuit SW12. The resistor R15 and the transistor T13 (n-type transistor) are coupled in series between the input pin IN of the power supply circuit 2 and the ground line. The control pin of the transistor T13 receives the output signal of the error amplifier ERA12. The coupling node of the resistor R15 and the transistor T13 are coupled to the control pin of the second bypass switch circuit T7. In other words, the signal generated at the coupling node of the resistor R15 and the transistor T13 is supplied to the control pin of the second bypass switch circuit T7 as the control signal D7.

In the output slope control circuit SC having the configuration described above, when 3.3 V is supplied as the input voltage Vi and 3.3 V is requested as the operation voltage of the non-volatile memory 3, the second output voltage Vo2 is supplied to the non-inverting input pin of the error amplifier ERA11 via the switch circuit SW11. Because of this, the error amplifier ERA11 generates an output signal by amplifying the voltage difference between the voltage of the first output voltage Vo1 divided by the resistors R11 and R12 and the second output voltage Vo2.

When the second output voltage Vo2 (the voltage of the non-inverting input pin of the error amplifier ERA11) is constant, if the voltage (the voltage of the inverting input pin of the error amplifier ERA11) of the first output voltage Vo1 divided by the resistors R11 and R12 becomes lower than the second output voltage Vo2, the voltage of the output signal of the error amplifier ERA11 rises, and therefore, the voltage of the coupling node of the resistor R13 and the transistor T11 drops and as a result, the voltage (the voltage of the control signal D6) of the coupling node of the transistor T12 and the resistor R14 rises. When the voltage of the control signal D6 rises, the first output voltage Vo1 rises because the on-state resistance of the first bypass switch circuit T6 becomes small.

When the first output voltage Vo1 rises and thereby the voltage of the first output voltage Vo1 divided by the resistors R11 and R12 approaches the second output voltage Vo2, the voltage of the output signal of the error amplifier ERA11 drops, and therefore, the voltage of the coupling node of the resistor R13 and the transistor T11 rises and the voltage (the voltage of the control signal D6) of the coupling node of the transistor T12 and the resistor R14 drops as a result. When the voltage of the control signal D6 drops, the first output voltage Vo1 drops because the on-state resistance of the first bypass switch circuit T6 becomes large.

In addition, when 3.3 V is supplied as the input voltage Vi and 3.3 V is requested as the operation voltage of the non-volatile memory 3, the ground voltage (0 V) is supplied to the non-inverting input pin of the error amplifier ERA12 via the switch circuit SW12. In the error amplifier ERA12, when the voltage of the non-inverting input pin is set to 0 V, the voltage of the output signal is set to 0 V irrespective of the voltage of the inverting input pin. Because of this, the control signal D7 is set to a high level by the drive circuit constituted by the resistor R15 and the transistor T13, and the second bypass switch circuit T7 enters the off-state.

In this manner, when 3.3 V is supplied as the input voltage Vi and 3.3 V is requested as the operation voltage of the non-volatile memory 3, the first bypass switch circuit T6 functions as a linear regulator such that the first output voltage Vo1 is constant with respect to the second output voltage Vo2 (the voltage of the non-inverting input pin of the error amplifier ERA11). Consequently, when the second output voltage Vo2 rises gradually at the time of start of the DC-DC converter CNV, the voltage of the non-inverting input pin of the error amplifier ERA11 rises, and therefore, the first output voltage Vo1 also rises. As a result, as shown in FIG. 16, the simultaneous activation of the first output voltage Vo1 and the second output voltage Vo2 is realized.

When 1.8 V is supplied as the input voltage Vi and 3.3 V is requested as the operation voltage of the non-volatile memory 3, the ground voltage (0 V) is supplied to the non-inverting input pin of the error amplifier ERA11 via the switch circuit SW11. In the error amplifier ERA11, when the voltage of the non-inverting input pin is set to 0 V, the voltage of the output signal is set to 0 V irrespective of the voltage of the inverting input pin. Because of this, the control signal D6 is set to a low level by the drive circuit constituted by the resistors R13 and R14 and the transistors T11 and T12, and the first bypass switch circuit T6 enters the off-state.

In addition, when 1.8 V is supplied as the input voltage Vi and 3.3 V is requested as the operation voltage of the non-volatile memory 3, the voltage (the voltage of the first output voltage Vo1 divided by the resistors R11 and R12) of the coupling node of the resistors R11 and R12 is supplied to the non-inverting input pin of the error amplifier ERA12 via the switch circuit SW12. Because of this, the error amplifier ERA12 generates an output signal by amplifying the voltage difference between the second output voltage Vo2 and the voltage of the first output voltage Vo1 divided by the resistors R11 and R12.

When the voltage (the voltage of the non-inverting input pin of the error amplifier ERA12) of the first output voltage Vo1 divided by the resistors R11 and R12 is constant, if the second output voltage Vo2 (the voltage of the inverting input pin of the error amplifier ERA12) becomes lower than the voltage of the first output voltage Vo1 divided by the resistors R11 and R12, the voltage of the output signal of the error amplifier ERA12 rises, and therefore, the voltage (the voltage of the control signal D7) of the coupling node of the resistor R15 and the transistor T13 drops. When the voltage of the control signal D7 drops, the on-state resistance of the second bypass switch circuit T7 becomes small, and therefore, the second output voltage Vo2 rises.

When the second output voltage Vo2 rises and thereby the second output voltage Vo2 approaches the voltage of the first output voltage Vo1 divided by the resistors R11 and R12, the voltage of the output signal of the error amplifier ERA12 drops, and therefore, the voltage (the voltage of the control signal D7) of the coupling node of the resistor R15 and the transistor T13 rises. When the voltage of the control signal D7 rises, the second output voltage Vo2 drops because the on-state resistance of the second bypass switch circuit T7 becomes large.

In this manner, when 1.8 V is supplied as the input voltage Vi and 3.3 V is requested as the operation voltage of the non-volatile memory 3, the second bypass switch circuit T7 functions as a linear regulator such that the second output voltage Vo2 is constant with respect to the voltage (the voltage of the non-inverting input pin of the error amplifier ERA12) of the first output voltage Vo1 divided by the resistors R11 and R12. Consequently, when the first output voltage Vo1 rises gradually at the time of start of the DC-DC converter CNV, the voltage of the non-inverting input pin of the error amplifier ERA12 rises, and therefore, the second output voltage Vo2 also rises. As a result, as shown in FIG. 16, the simultaneous activation of the first output voltage Vo1 and the second output voltage Vo2 is realized.

In the embodiment as described above, it is possible to share the DC-DC converter CNV between the non-volatile memory 3 and the memory card control circuit 4 by causing the DC-DC converter CNV, the first bypass switch circuit T6, and the second bypass switch circuit T7 to operate in accordance with a combination of the voltage value of the input voltage Vi and the voltage value (the voltage value of the operation voltage of the non-volatile memory 3) requested for the first output pin OUT1 and therefore to reduce the number of DC-DC converters.

In addition, it is possible to prevent the inrush current without fail by causing the DC-DC converter CNV as the step-down type DC-DC converter irrespective of the combination of the voltage value of the input voltage Vi and the voltage value requested for the first output pin OUT1 during the period from when the DC-DC converter CNV is started until when the output voltage (the first output voltage Vo1) of the DC-DC converter CNV becomes equal to the input voltage Vi when the DC-DC converter CNV operates as the boost type DC-DC converter, and it is made possible to control the rising slope of the first output voltage Vo1 from 0 V to 3.3 V. Further, it is possible to realize the simultaneous activation of the first output voltage Vo1 and the second output voltage Vo2 by causing the first bypass switch circuit T6 and the second bypass switch circuit T7 to operate in coupling with the DC-DC converter CNV. Consequently, it is possible to avoid the risk of burn-out caused by latch-up of a semiconductor device constituting the non-volatile memory 3 that uses the first output voltage Vo1 as the power supply voltage or the memory card control circuit 4 that uses the second output voltage Vo2 as the power supply voltage. In this manner, it is possible to realize the independence of the operation voltage of the memory card 1 from the operation voltage of the internal non-volatile memory 3 while securing the efficiency and safety.

By the way, in the embodiment described above, an example is described, in which the switch circuit SW1 couples the coupling node of the resistors R1 and R2 to the inverting input pin of the error amplifier ERA1, taking into consideration the case where the variation of the first output voltage Vo1 (the power supply voltage of the non-volatile memory 3) becomes larger than the variation of the second output voltage Vo2 (the power supply voltage of the memory card control circuit 4) when 3.3 V is supplied as the input voltage Vi and 1.8 V is requested as the operation voltage of the non-volatile memory 3 (second mode), however, the embodiment is not limited to this embodiment. It may also be possible for the switch circuit SW1 to couple the coupling node of the resistors R3 and R4 to the inverting input pin of the error amplifier ERA1 when 3.3 V is supplied as the input voltage Vi and 1.8 V is requested as the operation voltage of the non-volatile memory 3 and if the difference between the variation of the first output voltage Vo1 and the variation of the second output voltage Vo2 is slight.

Similarly, in the embodiment described above, an example is described, in which the switch circuit SW1 couples the coupling node of the resistors R1 and R2 to the inverting input pin of the error amplifier ERA1, taking into consideration the case where the variation of the first output voltage Vo1 becomes larger than the variation of the second output voltage Vo2 when 1.8 V is supplied as the input voltage Vi and 1.8 V is requested as the operation voltage of the non-volatile memory 3 (fourth mode), however, the embodiment is not limited to this embodiment. It may also be possible for the switch circuit SW1 to couple the coupling node of the resistors R3 and R4 to the inverting input pin of the error amplifier ERA1 when 1.8 V is supplied as the input voltage Vi and 1.8

V is requested as the operation voltage of the non-volatile memory 3 and if the difference between the variation of the first output voltage Vo1 and the variation of the second output voltage Vo2 is slight.

An object of the aforementioned embodiment is to realize the independence of the operation voltage of a memory card from that of an internal non-volatile memory while securing the efficiency and safety.

In an aspect of the embodiment, a power supply circuit is configured so as to include an input pin, a first output pin, a second output pin, a DC-DC converter, a first bypass switch circuit, a second bypass switch circuit, a start control circuit, and an output slope control circuit. For example, the power supply circuit is constituted using a semiconductor device. The input pin receives a voltage of either a first predetermined value or a second predetermined value smaller than the first predetermined value. For the first output pin, the output of a voltage of either the first or second predetermined value is required. For the second output pin, the output of a voltage of the second predetermined value is required. For example, the power supply circuit is mounted on a memory card that has a non-volatile memory and a memory control circuit that controls the non-volatile memory. The voltage of the first output pin is used as the power supply voltage of the non-volatile memory and the voltage of the second output pin is used as the power supply voltage of the memory control circuit.

The DC-DC converter generates an output voltage from the voltage of the input pin in either a step-down mode or a boost mode and outputs the output voltage to at least one of the first and second output pins in accordance with a combination of the voltage value of the input pin and the voltage value required for the first output pin. The first bypass switch circuit turns on to output the voltage of the input pin to the first output pin when the voltage is not output to the first output pin from the DC-DC converter. The second bypass switch circuit turns on to output the voltage of the input pin to the second output pin when the voltage is not output to the second output pin from the DC-DC converter.

The start control circuit causes the DC-DC converter to operate in the step-down mode irrespective of the combination of the voltage value of the input pin and the voltage value required for the first output pin during the period from when the DC-DC converter is started until the output voltage of the DC-DC converter becomes equal to the voltage of the input pin. The output slope control circuit synchronizes the rising slope of the output voltage of the first bypass switch circuit with the rising slope of the output voltage of the DC-DC converter when the first bypass switch circuit turns on and synchronizes the rising slope of the output voltage of the second bypass switch circuit with the rising slope of the output voltage of the DC-DC converter when the second bypass switch circuit turns on.

For example, the DC-DC converter circuit generates an output voltage of the second predetermined value from the voltage of the input pin in the step-down mode and outputs the output voltage to the second output pin when the voltage value of the input pin is the first predetermined value and the voltage value required for the first output pin is the first predetermined value. The start control circuit generates an output voltage of the second predetermined value from the voltage of the input pin in the step-down mode and outputs the output voltage to the first and second output pins when the voltage value of the input pin is the first predetermined value and the voltage value required for the first output pin is the second predetermined value. The start control circuit generates an output voltage of the first predetermined value from the voltage of the input pin in the boost mode and outputs the output voltage to the first output pin when the voltage value of the input pin is the second predetermined value and the voltage value required for the first output pin is the first predetermined value. The start control circuit generates an output voltage of the second predetermined value from the voltage of the input pin in the boost mode and outputs the output voltage to the first and second output pins when the voltage value of the input pin is the second predetermined value and the voltage value required for the first output pin is the second predetermined value.

Preferably, the output slope control circuit is configured so as to include a first on-state resistance control circuit and a second on-state resistance control circuit. The first on-state resistance control circuit detects a voltage difference between the voltage that follows the voltage of the first output pin and the voltage of the second output pin and controls the on-state resistance of the first bypass switch circuit in accordance with the detection result when the first bypass switch circuit turns on. The second on-state resistance control circuit detects a voltage difference between the voltage of the second output pin and the voltage that follows the voltage of the first output pin and controls the on-state resistance of the second bypass switch circuit in accordance with the detection result when the second bypass switch circuit turns on.

In the aspect of the embodiment as described above, it is possible to share the DC-DC converter between the non-volatile memory and the memory control circuit by causing the DC-DC converter, the first and second bypass switch circuits to operate in accordance with a combination of the voltage value of the input voltage and the voltage value required for the first output pin and therefore to reduce the number of DC-DC converters. In addition, it is possible to prevent without fail the inrush current when the DC-DC converter operates in the boost mode by providing the start control circuit. Further, it is possible to realize simultaneous activation of the voltage of the first output pin and the voltage of the second output pin by causing the first and second bypass switch circuits to operate in connection with the DC-DC converter by providing the output slope control circuit. Consequently, it is possible to avoid the risk of burn-out caused by latch-up of a semiconductor device constituting the non-volatile memory or the memory control circuit. In this manner, it is possible to realize the independence of the operation voltage of the memory card from that of the internal non-volatile memory while securing the efficiency and safety.

The invention is not limited to the above embodiments and various modifications may be made without departing from the spirit and scope of the embodiments. Any improvement may be made in part or all of the components.

What is claimed is:

1. A power supply circuit comprising:
   an input pin receiving a voltage of either a first predetermined value or a second predetermined value smaller than the first predetermined value;
   a first output pin for which an output of a voltage of either the first or second predetermined value is required;
   a second output pin for which an output of a voltage of the second predetermined value is required;
   a DC-DC converter generating an output voltage from the voltage of the input pin in either a step-down mode or a boost mode and outputting the output voltage to at least one of the first and second output pins in accordance with a combination of the voltage value of the input pin and the voltage value required for the first output pin;
   a first bypass switch circuit turning on to output the voltage of the input pin to the first output pin when the voltage is not output to the first output pin from the DC-DC converter;

a second bypass switch circuit turning on to output the voltage of the input pin to the second output pin when the voltage is not output to the second output pin from the DC-DC converter;

a start control circuit causing the DC-DC converter to operate in the step-down mode irrespective of the combination of the voltage value of the input pin and the voltage value required for the first output pin during the period from when the DC-DC converter is started until the output voltage of the DC-DC converter becomes equal to the voltage of the input pin; and an output slope control circuit synchronizing a rising slope of the output voltage of the first bypass switch circuit with a rising slope of the output voltage of the DC-DC converter when the first bypass switch circuit turns on and synchronizes a rising slope of the output voltage of the second bypass switch circuit with a rising slope of the output voltage of the DC-DC converter when the second bypass switch circuit turns on.

2. The power supply circuit according to claim 1, wherein the DC-DC converter:

generates an output voltage of the second predetermined value from the voltage of the input pin in the step-down mode and outputs the output voltage to the second output pin when the voltage value of the input pin is the first predetermined value and the voltage value required for the first output pin is the first predetermined value;

generates an output voltage of the second predetermined value from the voltage of the input pin in the step-down mode and outputs the output voltage to the first and second output pins when the voltage value of the input pin is the first predetermined value and the voltage value required for the first output pin is the second predetermined value;

generates an output voltage of the first predetermined value from the voltage of the input pin in the boost mode and outputs the output voltage to the first output pin when the voltage value of the input pin is the second predetermined value and the voltage value required for the first output pin is the first predetermined value; and generates an output voltage of the second predetermined value from the voltage of the input pin in the boost mode and outputs the output voltage to the first and second output pins when the voltage value of the input pin is the second predetermined value and the voltage value required for the first output pin is the second predetermined value.

3. The power supply circuit according to claim 1, wherein the output slope control circuit includes:

a first on-state resistance control circuit that detects a voltage difference between a voltage that follows the voltage of the first output pin and the voltage of the second output pin and controls an on-state resistance of the first bypass switch circuit in accordance with the detection result when the first bypass switch circuit turns on; and a second on-state resistance control circuit that detects a voltage difference between the voltage of the second output pin and a voltage that follows the voltage of the first output pin and controls an on-state resistance of the second bypass switch circuit in accordance with the detection result when the second bypass switch circuit turns on.

4. The power supply circuit according to claim 1, wherein:

the power supply circuit is mounted on a memory card that has a non-volatile memory and a memory control circuit that controls the non-volatile memory;

the voltage of the first output pin is used as a power supply voltage of the non-volatile memory; and the voltage of the second output pin is used as a power supply voltage of the memory control circuit.

5. The power supply circuit according to claim 1, wherein the power supply circuit is constituted using a semiconductor device.

6. A power supply control circuit used in a power supply circuit comprising:

an input pin receiving a voltage of either a first predetermined value or a second predetermined value smaller than the first predetermined value;

a first output pin for which an output of a voltage of either the first or second predetermined value is required;

a second output pin for which an output of a voltage of the second predetermined value is required;

a DC-DC converter generating an output voltage from the voltage of the input pin in either a step-down mode or a boost mode and outputs the output voltage to at least one of the first and second output pins in accordance with a combination of the voltage value of the input pin and the voltage value required for the first output pin;

a first bypass switch circuit turning on to output the voltage of the input pin to the first output pin when the voltage is not output to the first output pin from the DC-DC converter; and a second bypass switch circuit turning on to output the voltage of the input pin to the second output pin when the voltage is not output to the second output pin from the DC-DC converter, the power supply control circuit comprising;

a start control circuit causing the DC-DC converter to operate in the step-down mode irrespective of the combination of the voltage value of the input pin and the voltage value required for the first output pin during the period from when the DC-DC converter is started until the output voltage of the DC-DC converter becomes equal to the voltage of the input pin; and an output slope control circuit synchronizing a rising slope of the output voltage of the first bypass switch circuit with a rising slope of the output voltage of the DC-DC converter when the first bypass switch circuit turns on and synchronizes a rising slope of the output voltage of the second bypass switch circuit with a rising slope of the output voltage of the DC-DC converter when the second bypass switch circuit turns on.

7. The power supply control circuit according to claim 6, wherein the output slope control circuit includes:

a first on-state resistance control circuit that detects a voltage difference between a voltage that follows the voltage of the first output pin and the voltage of the second output pin and controls an on-state resistance of the first bypass switch circuit in accordance with the detection result when the first bypass switch circuit turns on; and a second on-state resistance control circuit that detects a voltage difference between the voltage of the second output pin and a voltage that follows the voltage of the first output pin and controls an on-state resistance of the second bypass switch circuit in accordance with the detection result when the second bypass switch circuit turns on.

8. The power supply control circuit according to claim 6, wherein:

the power supply circuit is mounted on a memory card that has a non-volatile memory and a memory control circuit that controls the non-volatile memory;

the voltage of the first output pin is used as a power supply voltage of the non-volatile memory; and the voltage of the second output pin is used as a power supply voltage of the memory control circuit.

9. A power supply control method controlling a power supply circuit comprising:

an input pin receiving a voltage of either a first predetermined value or a second predetermined value smaller than the first predetermined value;

a first output pin for which an output of a voltage of either the first or second predetermined value is required;

a second output pin for which an output of a voltage of the second predetermined value is required;

a DC-DC converter generating an output voltage from the voltage of the input pin in either a step-down mode or a boost mode and outputs the output voltage to at least one of the first and second output pins in accordance with a combination of the voltage value of the input pin and the voltage value required for the first output pin;

a first bypass switch circuit turning on to output the voltage of the input pin to the first output pin when the voltage is not output to the first output pin from the DC-DC converter; and a second bypass switch circuit that turns on to output the voltage of the input pin to the second output pin when the voltage is not output to the second output pin from the DC-DC converter, the method comprising:

a start control process causing the DC-DC converter to operate in the step-down mode irrespective of the combination of the voltage value of the input pin and the voltage value required for the first output pin during the period from when the DC-DC converter is started until the output voltage of the DC-DC converter becomes equal to the voltage of the input pin; and an output slope control process synchronizing a rising slope of the output voltage of the first bypass switch circuit with a rising slope of the output voltage of the DC-DC converter when the first bypass switch circuit turns on and synchronizes a rising slope of the output voltage of the second bypass switch circuit with a rising slope of the output voltage of the DC-DC converter when the second bypass switch circuit turns on.

10. The power supply control method according to claim 9, wherein the output slope control process includes:

a first on-state resistance control process that detects a voltage difference between a voltage that follows the voltage of the first output pin and the voltage of the second output pin and controls an on-state resistance of the first bypass switch circuit in accordance with the detection result when the first bypass switch circuit turns on; and a second on-state resistance control process that detects a voltage difference between the voltage of the second output pin and a voltage that follows the voltage of the first output pin and controls an on-state resistance of the second bypass switch circuit in accordance with the detection result when the second bypass switch circuit turns on.

11. The power supply control method according to claim 9, wherein the power supply circuit is mounted on a memory card that has a non-volatile memory and a memory control circuit that controls the non-volatile memory;

the voltage of the first output pin is used as a power supply voltage of the non-volatile memory; and the voltage of the second output pin is used as a power supply voltage of the memory control circuit.

* * * * *